US012539230B2

(12) United States Patent
Taylor et al.

(10) Patent No.: US 12,539,230 B2
(45) Date of Patent: Feb. 3, 2026

(54) THERMAL SYSTEM WITH IMPROVED USER INTERFACE

(71) Applicant: Stryker Corporation, Kalamazoo, MI (US)

(72) Inventors: Gregory S. Taylor, Kalamazoo, MI (US); Marco Constant, Johnson City, TN (US); Gideon P. Brewer, Grand Rapids, MI (US); Robert Christopher Rusin, Richland, MI (US); Christopher John Hopper, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 799 days.

(21) Appl. No.: 16/912,256

(22) Filed: Jun. 25, 2020

(65) Prior Publication Data

US 2020/0405530 A1    Dec. 31, 2020

Related U.S. Application Data

(60) Provisional application No. 62/868,098, filed on Jun. 28, 2019.

(51) Int. Cl.
*A61F 7/00*         (2006.01)
(52) U.S. Cl.
CPC .... *A61F 7/0085* (2013.01); *A61F 2007/0086* (2013.01); *A61F 2007/0093* (2013.01);
(Continued)
(58) Field of Classification Search
None
See application file for complete search history.

(56) References Cited

U.S. PATENT DOCUMENTS 8,257,414 B2    9/2012  Kelner et al.
9,569,591 B2    2/2017  Vanderpohl, III
(Continued)

FOREIGN PATENT DOCUMENTS

CN    108885898    *   2/2017   ............. G16H 20/00

OTHER PUBLICATIONS

Arctic Sun 5000 Service Manual by Medivance, Inc., 2010-2011.
(Continued)

*Primary Examiner* — Sean W Collins
*Assistant Examiner* — Nora W Rhodes
(74) *Attorney, Agent, or Firm* — Gardner, Linn, Burkhart & Ondersma LLP

(57) ABSTRACT

A thermal control unit for controlling a patient's temperature includes a fluid outlet for delivering temperature-controlled fluid to a patient, a fluid inlet for receiving the fluid back, a pump, a heat exchanger, a controller for controlling the heat exchanger, a patient temperature port for receiving patient temperature readings, a memory, and a user interface that displays various data regarding thermal therapy sessions applied to patients using the thermal control unit. In some embodiments, past statistical data from previous thermal therapy sessions is stored in the memory and the controller displays a comparison of a current parameter of the current thermal therapy session to the past statistical data. The controller may also or alternatively automatically select a particular type of screen to display based on a type of user of the thermal control unit. The controller may also or alternatively generate after-session thermal therapy reports.

12 Claims, 9 Drawing Sheets

(52) U.S. Cl.
CPC .......... *A61F 2007/0094* (2013.01); *A61F 2007/0096* (2013.01)

(56) References Cited

U.S. PATENT DOCUMENTS

| | | | |
|---|---|---|---|
| 10,729,578 B2 | 8/2020 | Carson et al. | |
| 2002/0095198 A1* | 7/2002 | Whitebook | A61M 25/0017 607/101 |
| 2002/0196141 A1* | 12/2002 | Boone | A61B 5/742 340/540 |
| 2008/0071150 A1* | 3/2008 | Miesel | G16H 20/30 600/509 |
| 2009/0112298 A1 | 4/2009 | Jusiak et al. | |
| 2012/0172956 A1 | 7/2012 | Dewaegenaere | |
| 2013/0296669 A1* | 11/2013 | Chen | A61B 5/6814 600/323 |
| 2014/0297327 A1 | 10/2014 | Heil et al. | |
| 2014/0343639 A1 | 11/2014 | Hopper et al. | |
| 2015/0025525 A1* | 1/2015 | Willard | A61B 18/16 606/34 |
| 2016/0140307 A1 | 5/2016 | Brosnan et al. | |
| 2017/0021184 A1* | 1/2017 | Pavel | A61N 1/0456 |
| 2017/0348144 A1* | 12/2017 | Taylor | A61F 7/08 |
| 2017/0348449 A1 | 12/2017 | Ward et al. | |
| 2018/0014967 A1 | 1/2018 | Taylor | |
| 2018/0042762 A1 | 2/2018 | Galer | |
| 2018/0042763 A1 | 2/2018 | Galer et al. | |
| 2018/0098878 A1 | 4/2018 | Kostic et al. | |
| 2018/0140459 A1 | 5/2018 | Taylor et al. | |
| 2018/0214301 A1 | 8/2018 | Fojtik et al. | |
| 2018/0242850 A1* | 8/2018 | Ellis | A61B 5/02007 |
| 2018/0280191 A1 | 10/2018 | Taylor et al. | |
| 2019/0139440 A1* | 5/2019 | Saito | G06Q 10/10 |
| 2019/0192339 A1 | 6/2019 | Taylor et al. | |
| 2019/0358454 A1* | 11/2019 | Lin | A61N 1/36167 |
| 2020/0179168 A1* | 6/2020 | Kelleher | A61F 9/009 |

OTHER PUBLICATIONS

Gaymar Medi-Therm III, Hyper/Hypothermia Machine Ref MTA7912 Service Manual, Nov. 2009.
Altrix Precision Temperature Management System Stryker Operations Manuel, Dec. 2016.
Sorin Group, Heater-Cooling System 3T, Operating Instructions, 2015.

* cited by examiner

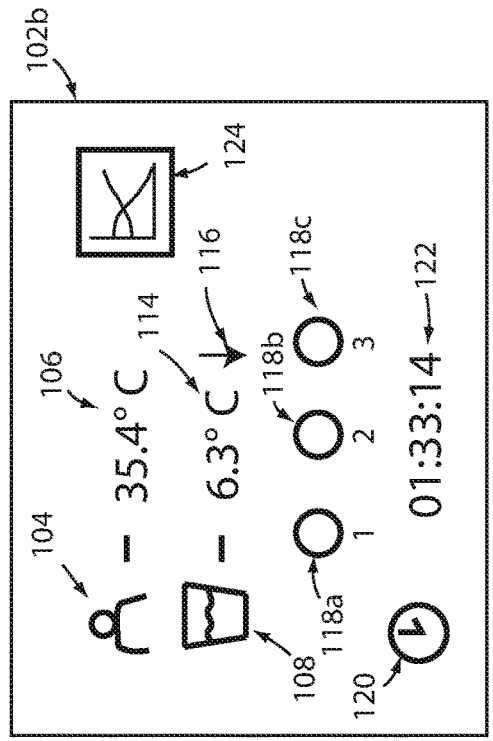
EMS  FIG. 4
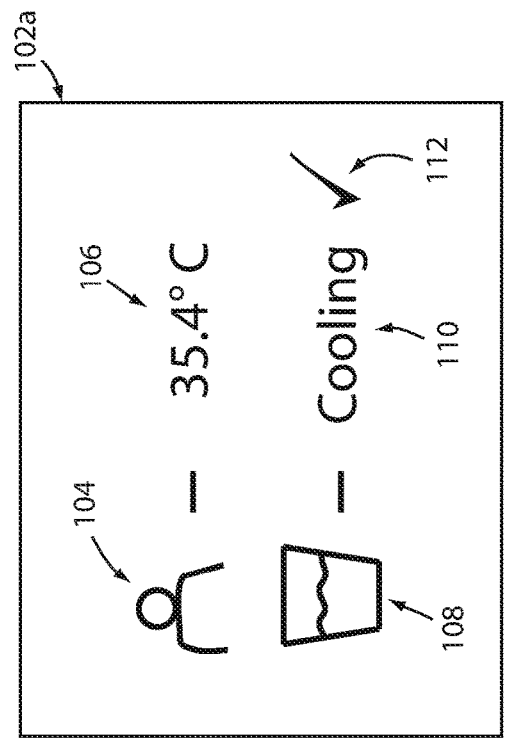
ICU Nurse  FIG. 5
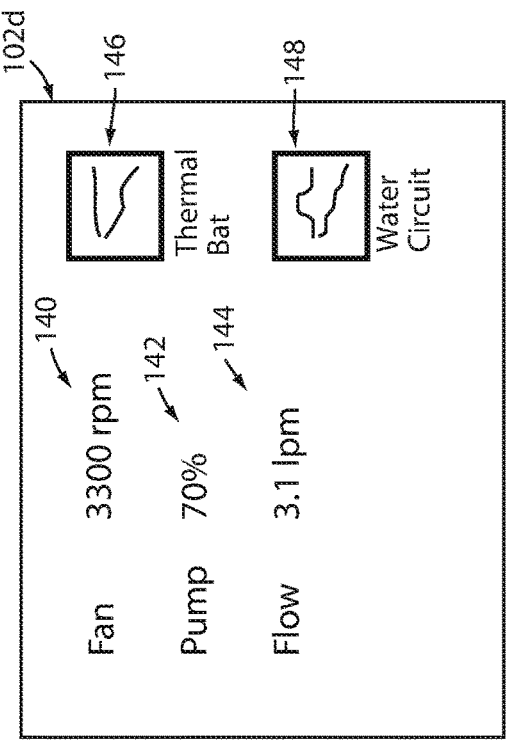
Clinician  FIG. 6
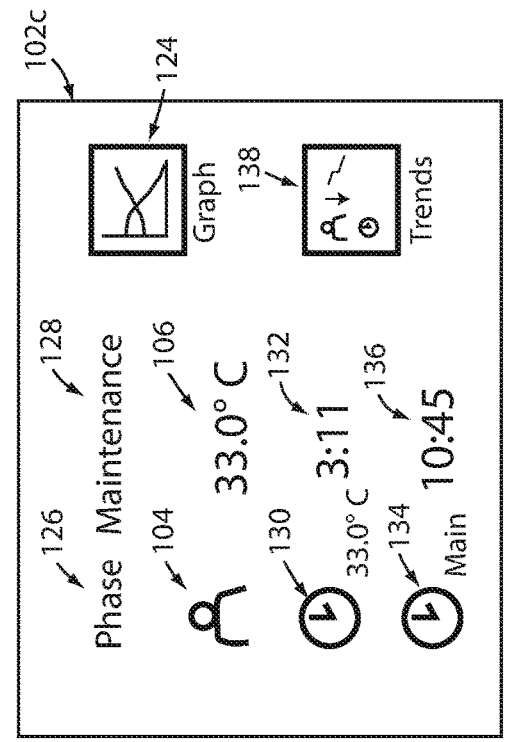
Maintenance  FIG. 7

THERMAL SYSTEM WITH IMPROVED USER INTERFACE

CROSS-REFERENCE TO RELATED APPLICATIONS

This application claims priority to U.S. provisional patent application Ser. No. 62/868,098 filed Jun. 28, 2019, by inventors Gregory S. Taylor et al. and entitled THERMAL SYSTEM WITH IMPROVED USER INTERFACE, the complete disclosure of which is incorporated herein by reference.

BACKGROUND

The present disclosure relates to a thermal control system for controlling the temperature of circulating fluid that is delivered to one or more thermal devices positioned in contact with a patient.

Thermal control systems are known in the art for controlling the temperature of a patient by providing a thermal control unit that supplies temperature-controlled fluid to one or more thermal pads or catheters positioned in contact with a patient. The thermal control unit includes one or more heat exchangers for controlling the temperature of the fluid and a pump that pumps the temperature-controlled fluid to the pad(s) and/or catheter. After passing through the pad(s) and/or catheter, the fluid is returned to the thermal control unit where any necessary adjustments to the temperature of the returning fluid are made before being pumped back to the pad(s) and/or catheter. In some instances, the temperature of the fluid is controlled to a static target temperature, while in other instances the temperature of the fluid is varied as necessary in order to automatically effectuate a target patient temperature.

Thermal control units typically include a user interface adapted to allow the user to input information for using the thermal control unit, as well as for displaying information useful to the user of the thermal control unit. Thermal treatment sessions in which the thermal control unit is utilized for controlling the patient's temperature can last for many hours, and in some cases may extend for more than a day. Multiple individuals may interact with the patient and/or the thermal control unit over the course of such a thermal therapy session.

SUMMARY

The present disclosure is directed to an improved thermal control unit that improves upon the user interface and helps the thermal therapy to be more easily and efficiently carried out by various personnel during the course of a thermal therapy session. The thermal control unit may be configured to display different types of screens according to different types of users wherein the different types of screens display different sets of information that are more suitably tailored to the different types of users. The thermal control unit may also or alternatively be configured to display past statistical data from previous thermal therapy sessions that has been gathered by the thermal control unit. The past statistical data may be displayed alongside and/or together with current data in order to provide the user with clear and easily discernable information regarding how the current thermal therapy session relates to previous ones. Still further, the thermal control unit may also or alternatively display one or more post-session thermal therapy reports indicating various parameters and/or measurements taken during the previous thermal therapy session.

According to one embodiment of the present disclosure, a thermal control unit is provided for controlling a patient's temperature during a thermal therapy session. The thermal control unit includes a fluid outlet, a fluid inlet, a circulation channel, a pump, a heat exchanger, a fluid temperature sensor, a patient temperature sensor, a user input, a display, and a controller. The fluid outlet is adapted to fluidly couple to a fluid supply line and the fluid inlet is adapted to fluidly couple to a fluid return line. The circulation channel is coupled to the fluid inlet and the fluid outlet and the pump circulates the fluid through the circulation channel from the fluid inlet to the fluid outlet. The heat exchanger is adapted to add or remove heat from the fluid circulating in the circulation channel. The fluid temperature sensor is adapted to sense a temperature of the fluid and the patient temperature sensor port is adapted to receive patient temperature readings from a patient temperature sensor. The user input is adapted to receive an input indicative of a type of user of the thermal control unit. The controller is adapted to control the heat exchanger in order to control the patient's temperature, as well as to automatically select a particular screen from amongst a plurality of types of screens to display on the display during the thermal therapy session. The controller selects the particular screen based on the input indicative of the type of user of the thermal control unit.

According to other aspects of the present disclosure, the display is a touchscreen display and the user input is an icon displayable on the touchscreen display. In other embodiments, the user input additionally or alternatively includes a button adapted to be pressed by the user.

In some embodiments, the types of users of the thermal control unit include at least the following: nurses, clinicians, and service technicians.

The user input, in some embodiments, is adapted to allow a user to select from at least three different types of users, and the plurality of types of screens include at least a first screen, a second screen, and a third screen. The first screen includes a first set of information, the second screen includes a second set of information, and the third screen includes a third set of information. In some of these embodiments, the first set of information is a subset of the second set of information.

The first set of information may include a temperature of the patient and the second set of information may include a time since the thermal therapy session commenced. In some embodiments, the third set of information includes an indication of a phase of the thermal therapy session. The phases of the thermal therapy session may refer to any of the following: warming phases, cooling phases, or maintenance phases.

In some embodiments, the second set of information includes a flow indicator indicating whether an amount of fluid flowing through at least one of the fluid outlet and the fluid inlet is within an acceptable range or not.

In some embodiments, the controller is adapted to allow a user to customize what information is contained within at least one of the first, second, or third sets of information.

The controller, in some embodiments, is further adapted to record in a memory current patient temperature readings with respect to time during a current thermal therapy session. The controller is also adapted to display on the display the current patient temperature readings with respect to time after the current thermal therapy session is completed.

The user input may be a wireless sensor adapted to detect a signal from a badge worn by the user, such as, but not limited to, a Radio-Frequency (RF) identification sensor adapted to detect an RFID badge worn by the caregiver.

The thermal control unit, in some embodiments, further includes a memory in which past rates of change of patient temperatures from previous thermal therapy sessions are stored. In such embodiments, the controller is configured to display on the display a comparison of a current rate of change of patient temperature to the past rates of change of patient temperature.

The thermal control unit, in some embodiments, further includes a memory in which past statistical data from previous thermal therapy sessions is stored. In such embodiments, the controller is configured to display on the display a comparison of a current parameter of a current thermal therapy session to the past statistical data.

According to another embodiment of the present disclosure, a thermal control unit for controlling a patient's temperature during a thermal therapy session is provided. The thermal control unit includes a fluid outlet, a fluid inlet, a circulation channel, a pump, a heat exchanger, a fluid temperature sensor, a patient temperature sensor, a memory, a display, and a controller. The fluid outlet is adapted to fluidly couple to a fluid supply line and the fluid inlet is adapted to fluidly couple to a fluid return line. The circulation channel is coupled to the fluid inlet and the fluid outlet and the pump circulates the fluid through the circulation channel from the fluid inlet to the fluid outlet. The heat exchanger is adapted to add or remove heat from the fluid circulating in the circulation channel. The fluid temperature sensor is adapted to sense a temperature of the fluid and the patient temperature sensor port is adapted to receive patient temperature readings from a patient temperature sensor. The memory has stored therein past statistical data from previous thermal therapy sessions. The controller is adapted to control the heat exchanger in order to control the patient's temperature, as well as to display on the display a comparison of a current parameter of a current thermal therapy session to the past statistical data.

According to other aspects of the present disclosure, the current parameter of the current thermal therapy session is a current patient temperature.

In some embodiments, the controller is configured to display a graph of current patient temperature readings over time and to display the past statistical data on the graph. The past statistical data may include a dispersion value of past patient temperature readings with respect to time. The dispersion value, if included, may be indicated on the display in units of standard deviations.

In some embodiments, the controller is configurable to issue an alert when the current parameter of the current thermal therapy session differs from the past statistical data by more than a user-customizable amount.

In some embodiments, the past statistical data is divided into a plurality of treatment categories and the controller determines into which one of the plurality of treatment categories the current thermal therapy session is to be categorized. The controller may be configured to compare the current parameter of the current thermal therapy session to only the past statistical data that is in the same treatment category as the treatment category of the current thermal therapy session.

The user interface, in some embodiments, includes a user interface having a category input. The controller is adapted to determine which one of the plurality of treatment categories the current thermal therapy session is to be categorized based on the category input.

In some embodiments, the controller is further adapted to record in the memory data from the current thermal therapy session, and to update the past statistical data with the data from the current thermal therapy session after the current thermal therapy session is completed.

In some embodiments, the thermal control unit includes a user input adapted to receive an input indicative of a type of user of the thermal control unit, and wherein the controller is further adapted to automatically select a particular screen from amongst a plurality of types of screens to display on the display during the current thermal therapy session. In such embodiments, the controller is adapted to select the particular screen based on the input indicative of the type of user of the thermal control unit.

According to still another embodiment of the present disclosure, a thermal control unit for controlling a patient's temperature during a thermal therapy session is provided. The thermal control unit includes a fluid outlet, a fluid inlet, a circulation channel, a pump, a heat exchanger, a fluid temperature sensor, a patient temperature sensor, a memory, a display, and a controller. The fluid outlet is adapted to fluidly couple to a fluid supply line and the fluid inlet is adapted to fluidly couple to a fluid return line. The circulation channel is coupled to the fluid inlet and the fluid outlet and the pump circulates the fluid through the circulation channel from the fluid inlet to the fluid outlet. The heat exchanger is adapted to add or remove heat from the fluid circulating in the circulation channel. The fluid temperature sensor is adapted to sense a temperature of the fluid and the patient temperature sensor port is adapted to receive patient temperature readings from a patient temperature sensor. The controller is adapted to control the heat exchanger in order to control the patient's temperature, as well as to record in the memory current patient temperature readings with respect to time during a current thermal therapy session. The controller is also configured to display on the display the current patient temperature readings with respect to time after the current thermal therapy session is completed as part of a post-therapy session report.

According to other aspects of the present disclosure, the controller may be further adapted to record in the memory an amount of time between commencement of the thermal therapy session and arrival of the patient at a patient target temperature. In such embodiments, the controller is further adapted to display the amount of time on the display after the current thermal therapy session is completed as part of the post-therapy session report.

In some embodiments, the controller is further adapted to display the patient target temperature on the display after the current thermal therapy session is completed as part of the post-therapy session report.

The controller, in some embodiments, is further adapted to determine an amount of overshoot of the patient's temperature beyond a patient target temperature during the current thermal therapy session. In such embodiments, the controller is further adapted to display the amount of overshoot on the display after the current thermal therapy session is completed as part of the post-therapy session report.

In some embodiments, the controller is further adapted to record in the memory a total amount of time the patient is maintained at a target temperature during the current thermal therapy session. The controller is further adapted to display the total amount of time on the display after the current thermal therapy session is completed as part of the post-therapy session report.

In some embodiments, the controller is further adapted to record in the memory a total amount of time the patient temperature is within a threshold range of the patient target temperature during the current thermal therapy session. The controller is further adapted to display the total amount of time on the display after the current thermal therapy session is completed as part of the post-therapy session report.

The controller may be adapted to record in the memory a target rate at which the patient is to be rewarmed during the current thermal therapy session, and to display the target rate on the display after the current thermal therapy session is completed as part of the post-therapy session report.

The controller may be adapted to record in the memory an actual rate at which the patient is rewarmed during the current thermal therapy session, and to display the actual rate on the display after the current thermal therapy session is completed as part of the post-therapy session report.

In some embodiments, the controller is further adapted to record in the memory a percentage of time the actual rate is within a threshold range of the target rate while the patient is rewarmed during the current thermal therapy session, and to display the percentage of time on the display after the current thermal therapy session is completed as part of the post-therapy session report.

In some embodiments, the controller is adapted to record in the memory at least four of the following parameters during the current thermal therapy session: (a) an amount of time between commencement of the thermal therapy session and arrival of the patient at a patient target temperature; (b) an amount of overshoot of the patient's temperature beyond a patient target temperature; (c) a total amount of time the patient is maintained at a target temperature; (d) a total amount of time the patient temperature is within a threshold range of the patient target temperature, (e) a target rate at which the patient is to be rewarmed; (f) an actual rate at which the patient is rewarmed; and (g) a percentage of time the actual rate is within a threshold range of the target rate while the patient is rewarmed. In such embodiments, the controller is further adapted to display the at least four parameters on the display after the current thermal therapy session is completed as part of the post-therapy session report.

In some embodiments, the controller is adapted to record in the memory past rates of change of patient temperatures from previous thermal therapy sessions, and to display on the display a comparison of a current rate of change of patient temperature to the past rates of change of patient temperature.

The controller may be adapted to record in the memory past statistical data from previous thermal therapy session, and to display on the display a comparison of a current parameter of the current thermal therapy session to the past statistical data.

Before the various embodiments disclosed herein are explained in detail, it is to be understood that the claims are not to be limited to the details of operation or to the details of construction, nor to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 4 is an example of a type of screen displayable on the thermal control unit that is intended for emergency service personnel;

FIG. 5 is an example of a type of screen displayable on the thermal control unit that is intended for nurses;

FIG. 6 is an example of a type of screen displayable on the thermal control unit that is intended for clinicians;

FIG. 7 is an example of a type of screen displayable on the thermal control unit that is intended for service technicians;

DETAILED DESCRIPTION OF THE EMBODIMENTS

Figure 1:
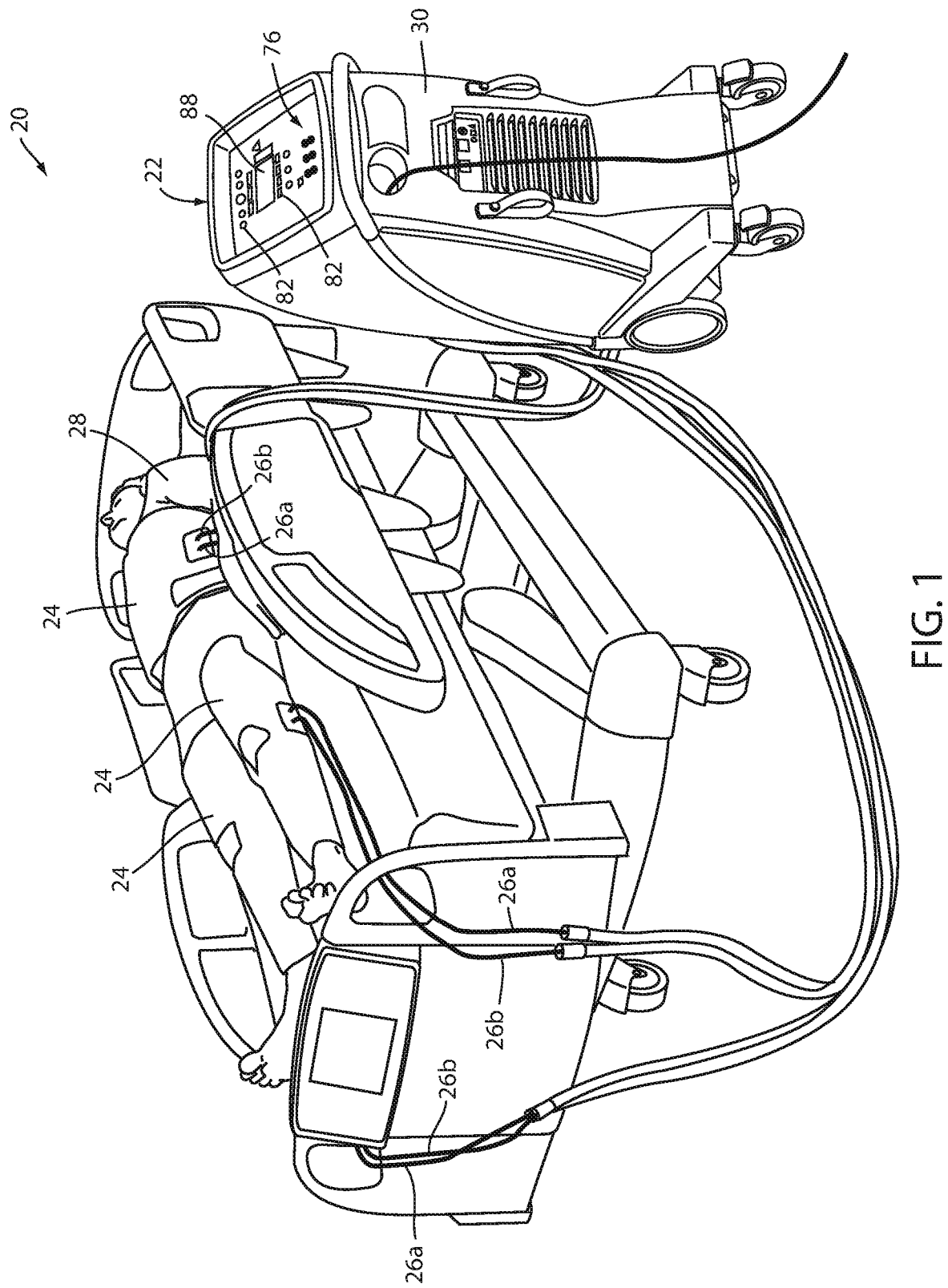
FIG. 1 is a perspective view of a thermal control system according to one aspect of the present disclosure shown applied to a patient on a patient support apparatus.

A thermal control system 20 according to one embodiment of the present disclosure is shown in FIG. 1. Thermal control system 20 is adapted to control the temperature of a patient 28, which may involve raising, lowering, and/or maintaining the patient's temperature. Thermal control system 20 includes a thermal control unit 22 coupled to one or more thermal therapy devices 24. The thermal therapy devices 24 are illustrated in FIG. 1 to be thermal pads, but it will be understood that thermal therapy devices 24 may take on other forms, such as, but not limited to, blankets, vests, patches, caps, catheters, or other structures that receive temperature-controlled fluid. For purposes of the following written description, thermal therapy devices 24 will be referred to as thermal pads 24, but it will be understood by those skilled in the art that this terminology is used merely for convenience and that the phrase "thermal pad" is intended to cover all of the different variations of thermal therapy devices 24 mentioned above (e.g. blankets, vests, patches, caps, catheters, etc.) and variations thereof.

Thermal control unit 22 is coupled to thermal pads 24 via a plurality of hoses 26. Thermal control unit 22 delivers temperature-controlled fluid (such as, but not limited to, water or a water mixture) to the thermal pads 24 via the fluid supply hoses 26*a*. After the temperature-controlled fluid has passed through thermal pads 24, thermal control unit 22 receives the temperature-controlled fluid back from thermal pads 24 via the return hoses 26*b*.

In the embodiment of thermal control system 20 shown in FIG. 1, three thermal pads 24 are used in the treatment of patient 28. A first thermal pad 24 is wrapped around a patient's torso, while second and third thermal pads 24 are wrapped, respectively, around the patient's right and left legs. Other configurations can be used and different numbers of thermal pads 24 may be used with thermal control unit 22, depending upon the number of inlet and outlet ports that are included with thermal control unit 22. By controlling the temperature of the fluid delivered to thermal pads 24 via supply hoses 26*a*, the temperature of the patient 28 can be controlled via the close contact of the pads 24 with the patient 28 and the resultant heat transfer therebetween.

Figure 2:
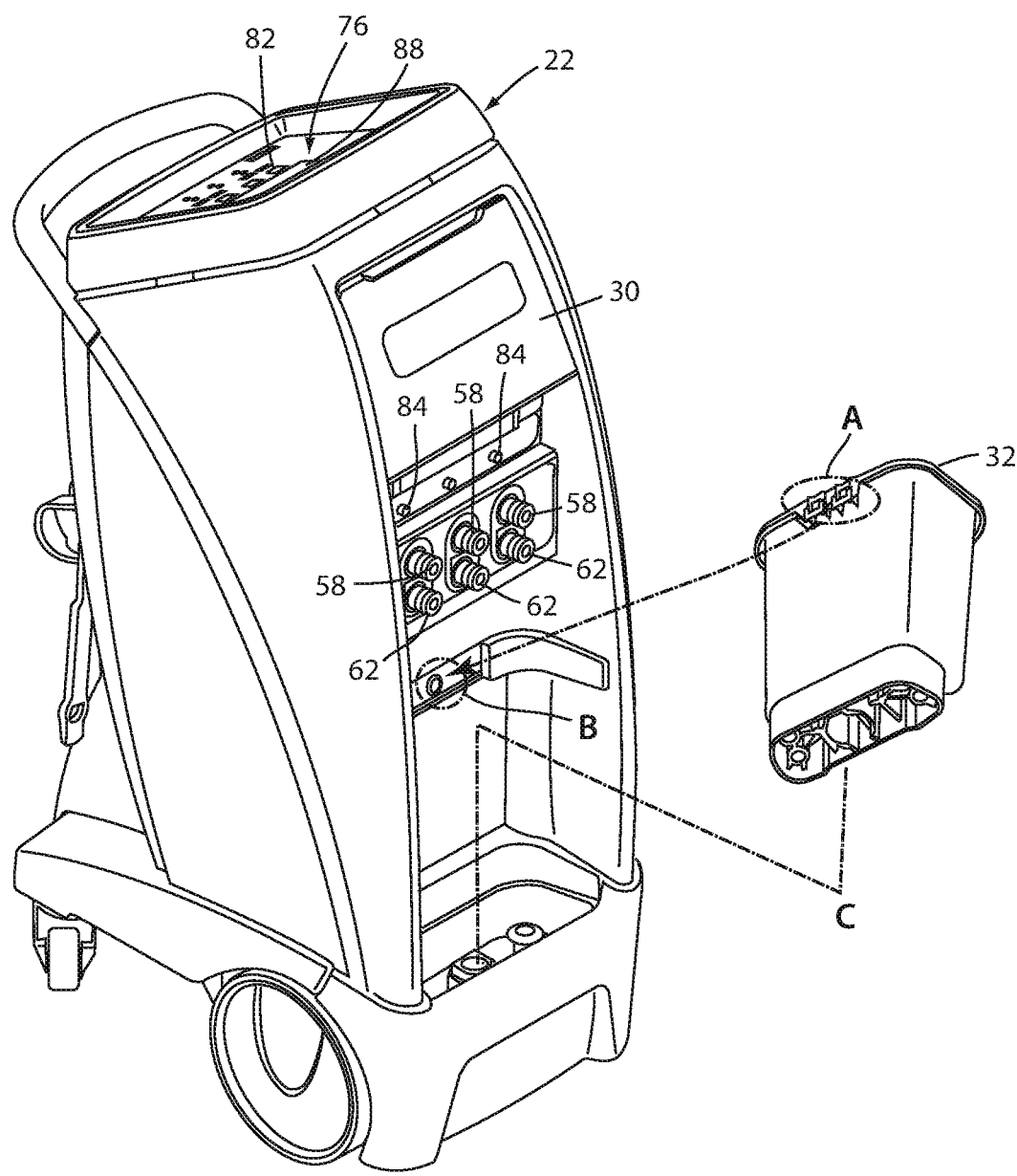
FIG. 2 is a perspective view of a thermal control unit of the thermal control system of FIG. 1.

As shown more clearly in FIG. 2, thermal control unit 22 includes a main body 30 to which a removable reservoir 32 may be coupled and uncoupled. Removable reservoir 32 is configured to hold the fluid that is to be circulated through thermal control unit 22 and the one or more thermal pads 24. By being removable from thermal control unit 22, reservoir 32 can be easily carried to a sink or faucet for filling and/or dumping of the water or other fluid. This allows users of thermal control system 20 to more easily fill thermal control unit 22 prior to its use, as well as to drain thermal control unit 22 after use.

As can also be seen in FIG. 2, thermal control unit 22 includes a plurality of outlet ports 58 (three in the particular example of FIG. 2), a plurality of inlet ports 62 (three in this particular example). Outlet ports 58 are adapted to fluidly couple to supply hoses 26 and inlet ports are adapted to fluidly couple to return hoses 26*b*. Thermal control unit 22 also includes a user interface 76 having a plurality of dedicated controls 82, a display 88, and a plurality of patient temperature probe ports 84. The user interface 76, dedicated controls 82, display 88, and patient temperature probe ports 84 are described in more detail below.

Figure 3:
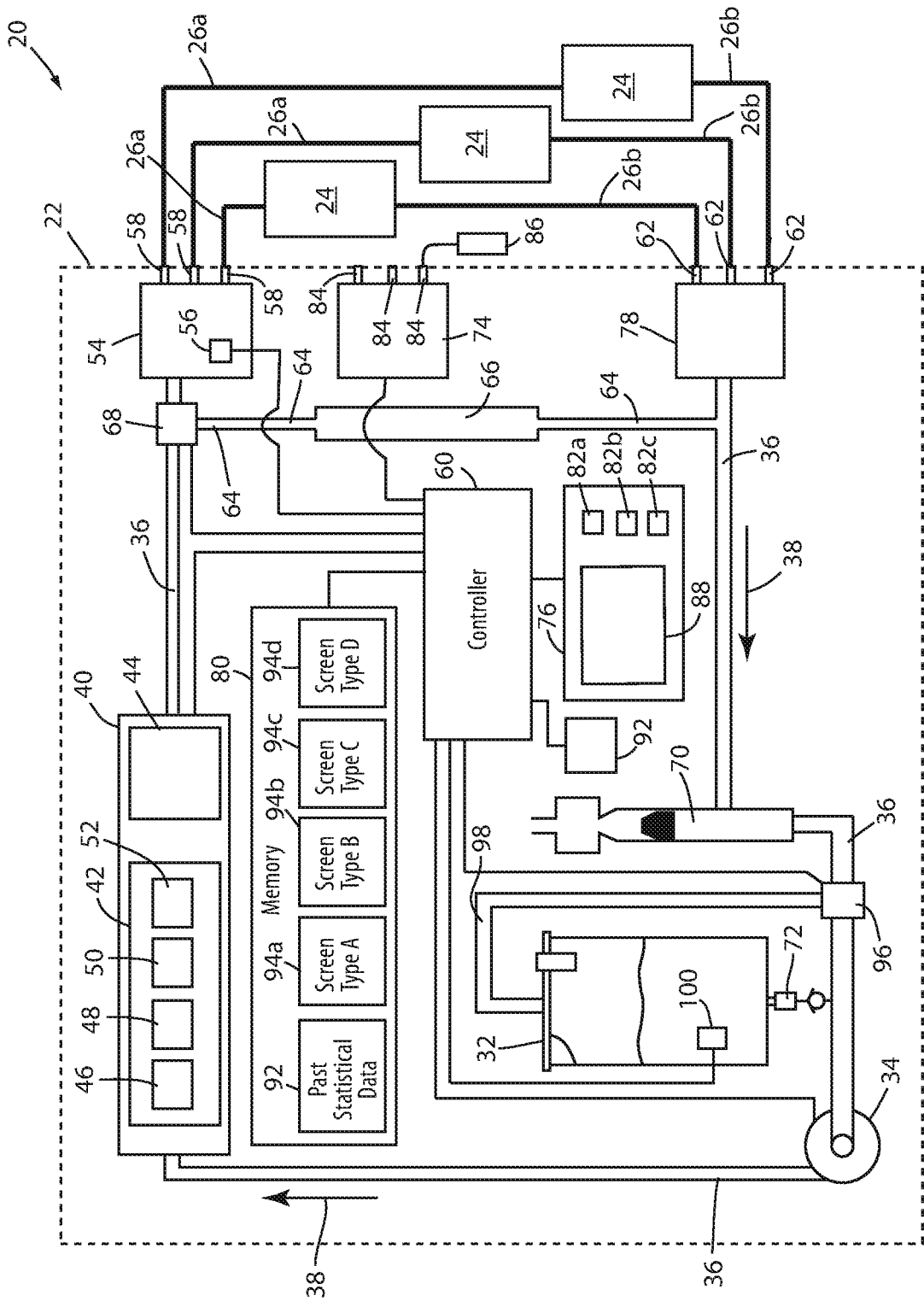
FIG. 3 is a block diagram of a first embodiment of the thermal control system of FIG. 1.

As shown in FIG. 3, thermal control unit 22 includes a pump 34 for circulating fluid through a circulation channel 36. Pump 34, when activated, circulates the fluid through circulation channel 36 in the direction of arrows 38 (clockwise in FIG. 3). Starting at pump 34 the circulating fluid first passes through a heat exchanger 40 that adjusts, as necessary, the temperature of the circulating fluid. Heat exchanger 40 may take on a variety of different forms. In some embodiments, heat exchanger 40 is a thermoelectric heater and cooler. In the embodiment shown in FIG. 3, heat exchanger 40 includes a chiller 42 and a heater 44. Further, in the embodiment shown in FIG. 3, chiller 42 is a conventional vapor-compression refrigeration unit having a compressor 46, a condenser 48, an evaporator 50, an expansion valve (not shown), and a fan 52 for removing heat from the compressor 46. Other types of chillers and/or heaters may be used.

After passing through heat exchanger 40, the circulating fluid is delivered to an outlet manifold 54 having an outlet temperature sensor 56 and a plurality of outlet ports 58. Temperature sensor 56 is adapted to detect a temperature of the fluid inside of outlet manifold 54 and report it to a controller 60. Outlet ports 58 are coupled to supply hoses 26*a*. Supply hoses 26*a* are coupled, in turn, to thermal pads 24 and deliver temperature-controlled fluid to the thermal pads 24. The temperature-controlled fluid, after passing through the thermal pads 24, is returned to thermal control unit 22 via return hoses 26*b*. Return hoses 26*b* couple to a plurality of inlet ports 62. Inlet ports 62 are fluidly coupled to an inlet manifold 78 inside of thermal control unit 22.

Thermal control unit 22 also includes a bypass line 64 fluidly coupled to outlet manifold 54 and inlet manifold 78 (FIG. 3). Bypass line 64 allows fluid to circulate through circulation channel 36 even in the absence of any thermal pads 24 or hoses 26*a* being coupled to any of outlet ports 58. In the illustrated embodiment, bypass line 64 includes an optional filter 66 that is adapted to filter the circulating fluid. If included, filter 66 may be a particle filter adapted to filter out particles within the circulating fluid that exceed a size threshold, or filter 66 may be a biological filter adapted to purify or sanitize the circulating fluid, or it may be a combination of both. In some embodiments, filter 66 is constructed and/or positioned within thermal control unit 22 in any of the manners disclosed in commonly assigned U.S. patent application Ser. No. 62/404,676 filed Oct. 11, 2016, by inventors Marko Kostic et al. and entitled THERMAL CONTROL SYSTEM, the complete disclosure of which is incorporated herein by reference.

The flow of fluid through bypass line 64 is controllable by way of a bypass valve 68 positioned at the intersection of bypass line 64 and outlet manifold 54 (FIG. 3). When open, bypass valve 68 allows fluid to flow through circulation channel 36 to outlet manifold 54, and from outlet manifold 54 to the connected thermal pads 24. When closed, bypass valve 68 stops fluid from flowing to outlet manifold 54 (and thermal pads 24) and instead diverts the fluid flow along bypass line 64. In some embodiments, bypass valve 68 may be controllable such that selective portions of the fluid are directed to outlet manifold 54 and along bypass line 64. In some embodiments, bypass valve 68 is controlled in any of the manners discussed in commonly assigned U.S. patent application Ser. No. 62/610,319, filed Dec. 26, 2017, by inventors Gregory Taylor et al. and entitled THERMAL SYSTEM WITH OVERSHOOT REDUCTION, the complete disclosure of which is incorporated herein by reference. In other embodiments, bypass valve 68 may be a pressure operated valve that allows fluid to flow along bypass line 64 if the fluid pressure in circulation channel 36 exceeds the cracking pressure of the bypass valve 68. Still further, in some embodiments, bypass valve 68 may be omitted and fluid may be allowed to flow through both bypass line 64 and into outlet manifold 54.

The incoming fluid flowing into inlet manifold 78 from inlet ports 62 and/or bypass line 64 travels back toward pump 34 and into an air remover 70. Air remover 70 includes any structure in which the flow of fluid slows down sufficiently to allow air bubbles contained within the circulating fluid to float upwardly and escape to the ambient surroundings. In some embodiments, air remover 70 is constructed in accordance with any of the configurations disclosed in commonly assigned U.S. patent application Ser. No. 15/646, 847 filed Jul. 11, 2017, by inventor Gregory S. Taylor and entitled THERMAL CONTROL SYSTEM, the complete disclosure of which is hereby incorporated herein by reference. After passing through air remover 70, the circulating fluid flows past a valve 72 positioned beneath fluid reservoir 32. Fluid reservoir 32 supplies fluid to thermal control unit 22 and circulation channel 36 via valve 72, which may be a conventional check valve, or other type of valve, that automatically opens when reservoir 32 is coupled to thermal control unit 22 and that automatically closes when reservoir 32 is decoupled from thermal control unit 22 (see FIG. 2). After passing by valve 72, the circulating fluid travels to pump 34 and the circuit is repeated.

Controller 60 of thermal control unit 22 is contained within main body 30 of thermal control unit 22 and is in electrical communication with pump 34, heat exchanger 40, outlet temperature sensor 56, bypass valve 68, a patient temperature module 74, a user interface 76, and a memory 80. Controller 60 includes any and all electrical circuitry and components necessary to carry out the functions and algorithms described herein, as would be known to one of ordinary skill in the art. Generally speaking, controller 60 may include one or more microcontrollers, microprocessors, and/or other programmable electronics that are programmed to carry out the functions described herein. It will be understood that controller 60 may also include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware, as would be known to one of ordinary skill in the art. Such components can be physically configured in any suitable manner, such as by mounting them to one or more circuit boards, or arranging them in other manners, whether combined into a single unit or distributed across multiple units. Such components may be physically distributed in different positions in thermal control unit 22, or they may reside in a common location within thermal control unit 22. When physically distributed, the components may communicate using any suitable serial or parallel communication protocol, such as, but not limited to, CAN, LIN, Firewire, I-squared-C, RS-232, RS-465, universal serial bus (USB), etc.

User interface 76, which may be implemented as a control panel or in other manners, allows a user to operate thermal control unit 22. User interface 76 communicates with controller 60 and includes a display 88 and a plurality of dedicated controls 82a, 82b, 82c, etc. Display 88 may be implemented as a touch screen, or, in some embodiments, as a non-touch-sensitive display. Dedicated controls 82 may be implemented as buttons, switches, dials, or other dedicated structures. In any of the embodiments, one or more of the functions carried out by a dedicated control 82 may be replaced or supplemented with a touch screen control that is activated when touched by a user. Alternatively, in any of the embodiments, one or more of the controls that are carried out via a touch screen can be replaced or supplemented with a dedicated control 82 that carries out the same function when activated by a user.

Through either dedicated controls 82 and/or a touch screen display (e.g. display 88), user interface 76 enables a user to turn thermal control unit 22 on and off, select a mode of operation, select a target temperature for the fluid delivered to thermal pads 24, select a patient target temperature, and control other aspects of thermal control unit 22. In some embodiments, user interface 76 may include a pause/event control, a medication control, and/or an automatic temperature adjustment control that operate in accordance with the pause event control 66b, medication control 66c, and automatic temperature adjustment control 66d disclosed in commonly assigned U.S. patent application Ser. No. 62/577,772 filed on Oct. 27, 2017, by inventors Gregory Taylor et al. and entitled THERMAL SYSTEM WITH MEDICATION INTERACTION, the complete disclosure of which is incorporated herein by reference. Such controls may be activated as touch screen controls or dedicated controls 82.

In those embodiments where user interface 76 allows a user to select from different modes for controlling the patient's temperature, the different modes include, but are not limited to, a manual mode and an automatic mode, both of which may be used for cooling and heating the patient. In the manual mode, a user selects a target temperature for the fluid that circulates within thermal control unit 22 and that is delivered to thermal pads 24. Thermal control unit 22 then makes adjustments to heat exchanger 40 in order to ensure that the temperature of the fluid exiting supply hoses 26a is at the user-selected temperature.

Another one of the modes is an automatic mode. When the user selects the automatic mode, the user selects a target patient temperature, rather than a target fluid temperature. After selecting the target patient temperature, controller 60 makes automatic adjustments to the temperature of the fluid in order to bring the patient's temperature to the desired patient target temperature. In this mode, the temperature of the circulating fluid may vary as necessary in order to bring about the target patient temperature.

In order to carry out the automatic mode, thermal control unit 22 utilizes patient temperature module 74. Patient temperature module 74 includes one or more patient temperature sensor ports 84 (FIGS. 2 & 3) that are adapted to receive one or more conventional patient temperature sensors or probes 86. The patient temperature sensors 86 may be any suitable patient temperature sensor that is able to sense the temperature of the patient at the location of the sensor. In one embodiment, the patient temperature sensors are conventional Y.S.I. 400 probes marketed by YSI Incorporated of Yellow Springs, Ohio, or probes that are YSI 400 compliant. In other embodiments, different types of sensors may be used with thermal control unit 22. Regardless of the specific type of patient temperature sensor used in thermal control system 20, each temperature sensor 86 is connected to a patient temperature sensor port 84 positioned on thermal control unit 22. Patient temperature sensor ports 84 are in electrical communication with controller 60 and provide current temperature readings of the patient's temperature.

Controller 60, in some embodiments, controls the temperature of the circulating fluid using closed-loop feedback from temperature sensor 56. That is, controller 60 determines (or receives) a target temperature of the fluid, compares it to the measured temperature from sensor 56, and issues a command to heat exchanger 40 that seeks to decrease the difference between the desired fluid temperature and the measured fluid temperature. In some embodiments, the difference between the fluid target temperature and the measured fluid temperature is used as an error value that is input into a conventional Proportional, Integral, Derivative (PID) control loop. That is, controller 60 multiplies the fluid temperature error by a proportional constant, determines the derivative of the fluid temperature error over time and multiplies it by a derivative constant, and determines the integral of the fluid temperature error over time and multiplies it by an integral constant. The results of each product are summed together and converted to a heating/cooling command that is fed to heat exchanger 40 and tells heat exchanger 40 whether to heat and/or cool the circulating fluid and how much heating/cooling power to use.

When thermal control unit 22 is operating in the automatic mode, controller 60 may use a second closed-loop control loop that determines the difference between a patient target temperature and a measured patient temperature. The patient target temperature is input by a user of thermal control unit 22 using user interface 76. The measured patient temperature comes from a patient temperature sensor 86 coupled to one of patient temperature sensor ports 84 (FIG. 3). Controller 60 determines the difference between the patient target temperature and the measured patient temperature and, in some embodiments, uses the resulting patient temperature error value as an input into a conventional PID control loop. As part of the PID loop, controller 60 multiplies the patient temperature error by a proportional constant, multiplies a derivative of the patient temperature error over time by a derivative constant, and multiplies an integral of the patient temperature error over time by an integral constant. The three products are summed together and converted to a target fluid temperature value. The target fluid temperature value is then fed to the first control loop discussed above, which uses it to compute a fluid temperature error.

It will be understood by those skilled in the art that other types of control loops may be used. For example, controller 60 may utilize one or more PI loops, PD loops, and/or other types of control equations. In some embodiments, the coefficients used with the control loops may be varied by controller 60 depending upon the patient's temperature reaction to the thermal therapy, among other factors. One example of such dynamic control loop coefficients is disclosed in commonly assigned U.S. patent application Ser. No. 62/577,772 filed on Oct. 27, 2017, by inventors Gregory Taylor et al. and entitled THERMAL SYSTEM WITH MEDICATION INTERACTION, the complete disclosure of which is incorporated herein by reference.

Regardless of the specific control loop utilized, controller 60 implements the loop(s) multiple times a second in at least one embodiment, although it will be understood that this rate may be varied widely. After controller 60 has output a heat/cool command to heat exchanger 40, controller 60 takes another patient temperature reading (from sensor 86) and/or another fluid temperature reading (from sensor 56) and re-performs the loop(s). The specific loop(s) used, as noted previously, depends upon whether thermal control unit 22 is operating in the manual mode or automatic mode.

It will also be understood by those skilled in the art that the output of any control loop used by thermal control unit 22 may be limited such that the temperature of the fluid delivered to thermal pads 24 never strays outside of a predefined maximum and a predefined minimum. Examples of such a predefined maximum temperature and predefined minimum temperature are disclosed and discussed in greater detail in commonly assigned U.S. patent application Ser. No. 16/222,004 filed Dec. 17, 2018, by inventors Gregory S. Taylor et al. and entitled THERMAL SYSTEM WITH GRAPHICAL USER INTERFACE, the complete disclosure of which is incorporated herein by reference. The predefined minimum temperature is designed as a safety temperature and may be set to about four degrees Celsius, although other temperatures may be selected. The predefined maximum temperature is also implemented as a safety measure and may be set to about forty degrees Celsius, although other values may be selected.

In some embodiments of thermal control unit 22, such as the embodiment shown in FIG. 3, thermal control unit 22 also includes a reservoir valve 96 that is adapted to selectively move fluid reservoir 32 into and out of line with circulation channel 36. Reservoir valve 96 is positioned in circulation channel 36 between air remover 70 and valve 72, although it will be understood that reservoir valve 96 may be moved to different locations within circulation channel 36. Reservoir valve 96 is coupled to circulation channel 36 as well as a reservoir channel 98. When reservoir valve 96 is open, fluid from air remover 70 flows along circulation channel 36 to pump 34 without passing through reservoir 32 and without any fluid flowing along reservoir channel 98. When reservoir valve 96 is closed, fluid coming from air remover 70 flows along reservoir channel 98, which feeds the fluid into reservoir 32. Fluid inside of reservoir 32 then flows back into circulation channel 36 via valve 72. Once back in circulation channel 36, the fluid flows to pump 34 and is pumped to the rest of circulation channel 36 and thermal pads 24 and/or bypass line 64. In some embodiments, reservoir valve 96 is either fully open or fully closed, while in other embodiments, reservoir valve 96 may be partially open or partially closed. In either case, reservoir valve 96 is under the control of controller 60.

In those embodiments of thermal control unit 22 that include a reservoir valve, thermal control unit 22 may also include a reservoir temperature sensor 100. Reservoir temperature sensor 100 reports its temperature readings to controller 60. When reservoir valve 96 is open, the fluid inside of reservoir 32 stays inside of reservoir 32 (after the initial drainage of the amount of fluid needed to fill circulation channel 36 and thermal pads 24). This residual fluid is substantially not affected by the temperature changes made to the fluid within circulation channel 36 as long as reservoir valve 96 remains open. This is because the residual fluid that remains inside of reservoir 32 after circulation channel 36 and thermal pads 24 have been filled does not pass through heat exchanger 40 and remains substantially thermally isolated from the circulating fluid. Two results flow from this: first, heat exchanger 40 does not need to expend energy on changing the temperature of the residual fluid in reservoir 32, and second, the temperature of the circulating fluid in circulation channel 36 will deviate from the temperature of the residual fluid as the circulating fluid circulates through heat exchanger 40.

In some embodiments, controller 60 utilizes a temperature control algorithm to control reservoir valve 96 that, in some embodiments, is the same as the temperature control algorithm 160 disclosed in commonly assigned U.S. patent application Ser. No. 62/577,772 filed on Oct. 27, 2017, by inventors Gregory Taylor et al. and entitled THERMAL SYSTEM WITH MEDICATION INTERACTION, the complete disclosure of which is incorporated herein by reference. In other embodiments, controller 60 utilizes a different control algorithm. In still other embodiments, thermal control unit 22 is modified to omit reservoir valve 96, reservoir channel 98, and reservoir temperature sensor 100. Thermal control unit 22 may also be modified such that reservoir 32 is always in the path of circulation channel 36. Still other modifications are possible.

It will be understood that the particular order of the components along circulation channel 36 of thermal control unit 22 may be varied from what is shown in FIG. 3. For example, although FIG. 3 depicts pump 34 as being upstream of heat exchanger 40 and air separator 70 as being upstream of pump 34, this order may be changed. Air separator 70, pump 34, heat exchanger 40 and reservoir 32 may be positioned at any suitable location along circulation channel 36. Indeed, in some embodiments, reservoir 32 is moved so as to be in line with and part of circulation channel 36, rather than external to circulation channel 36 as shown in FIG. 3, thereby forcing the circulating fluid to flow through reservoir 32 rather than around reservoir 32. Further details regarding the construction and operation of one embodiment of thermal control unit 22 that are not described herein may be found in commonly assigned U.S. patent application Ser. No. 14/282,383 filed May 20, 2014, by inventors Christopher Hopper et al. and entitled THERMAL CONTROL SYSTEM, the complete disclosure of which is incorporated herein by reference.

In some embodiments, thermal pads 24 are constructed in accordance with any of the thermal pads disclosed in any of the following commonly assigned U.S. patent applications: Ser. No. 15/675,061 filed Aug. 11, 2017, by inventors James Galer et al. and entitled THERMAL THERAPY DEVICES; Ser. No. 62/778,034 filed Dec. 11, 2018, by inventors Andrew M. Bentz et al. and entitled THERMAL SYSTEM WITH THERMAL PAD FILTERS; and Ser. No. 15/675,066 filed Aug. 11, 2017, by inventor James K. Galer and entitled THERMAL SYSTEM, the complete disclosures of all of which are incorporated herein by reference. Still other types of thermal pads 24 may be used with thermal control system 20, and thermal control unit 22 may be modified from its construction described herein in order to accommodate the particular thermal therapy pad(s) it is used with.

In the embodiment shown in FIG. 3, memory 80 of thermal control unit 22 includes a plurality of items stored therein, such as a set of past statistical data 92, a first screen type data set 94a, a second screen type data set 94b, a third screen type data set 94c, and a fourth screen type data set 94d. Past statistical data set 92 will be discussed in greater detail below with respect to FIGS. 12-13. Screen type data sets 94a-d will be discussed now with respect to FIGS. 4-7.

FIGS. 4-7 illustrate four different types of user screens 102a-d. User screens 102a-d are intended to be displayed on display 88 so that different types of users are presented with different types of information, and the different types of information that are presented to each type of user is more customized to that type of user. Thus, user screen 102a is intended to be displayed for emergency services personnel; user screen 102b is intended to be displayed to nurses; user screen 102c is intended to be displayed to clinicians; and user screen 102d is intended to be displayed to service technicians or other maintenance personnel. As can be seen in FIGS. 4-6, screen 102a includes the least amount of information; screen 102b includes more information than screen 102a but less than screen 102c; and screen 102c includes more information than either screen 102a or 102b. Screen 102d includes none of the information of screens 102a-c, but instead includes information that is more relevant to the servicing of thermal control unit 22. By including different screens 102a-d for different types of users, thermal control unit 22 provides easier usability for its various users.

Controller 60 determines which screen 102a-d to display on display 88, in at least one embodiment, in response to a dedicated control 82 (or an icon control on touchscreen 88) that a user presses, or otherwise activates, corresponding to that users particular type. Thus, for example, in one embodiment, thermal control unit 22 includes a first dedicated control 82a for EMS personnel that, when activated, causes controller 60 to display EMS screen 102a; a second dedicated control 82b for nurses that, when activated, causes controller 60 to display nurse screen 102b; a third dedicated control 82c for clinicians that, when activated, causes controller 60 to display clinician screen 102c; and a fourth dedicated control 82d (not shown) that, when activated, causes controller 60 to display service technician screen 102d.

In another alternative embodiment, controller 60 includes a user sensor 90 that senses a characteristic of whichever user is in close proximity to thermal control unit 22 (e.g. within approximately a couple of meters), and automatically selects which type of screen 102a-d to display based on the sensed characteristic. For example, in one embodiment, user sensor 90 is an RF ID sensor that is adapted to detect RF ID badges worn by healthcare personnel. In such situations, the ID contained within each badge either contains an identification of the type of user (e.g. EMS, nurse, clinician, or service tech), or thermal control unit 22 includes a database of user IDs along with a table, or other data structure, that correlates each ID to a particular type of user. Based on the detected ID and corresponding user type, controller 60 selects the appropriate screen 102a-d to display.

In an another alternative embodiment, thermal control unit 22 includes one or more near field sensors that are adapted to detect near field badges, cards, or other objects having a near field transceiver integrated into them. Users of thermal control unit 22 carry the near field badges, cards, or other objects with them and pass them within proximity to the near field sensor onboard thermal control unit 22 when they approach thermal control unit 22. In response to detecting the badge, card, or other near field object, controller 60 automatically determines the user type and selects the appropriate screen 102a-d to display on display 88.

In still another embodiment, thermal control unit 22 includes one or more cameras, or other images sensors, that are adapted to capture one or more images of the user while he or she is using thermal control unit 22. Based on the captured images, controller 60 executes facial recognition software to determine who the user is. Once the identity of the user is determined, controller 60 determines what type of user that particular individual corresponds to and selects the appropriate screen 102a-d. In this particular embodiment, thermal control unit 22 may include a network transceiver (e.g. Ethernet, WiFi, etc.) that communicates with a local area network of a healthcare facility and accesses photographs of known authorized individuals. Alternatively, thermal control unit 22 may include a port (e.g. USB, Ethernet, etc.) for enabling a user to upload data defining the faces of all of the authorized users of thermal control unit 22, as well as the type of user corresponding to the facial data of each user, thereby providing controller 60 with the necessary data to carry out the facial recognition process.

Regardless of the specific manner in which thermal control unit 22 selects what screen 102a-d to display on display 88, the layout and content of each screen 102a-d is defined by screen type data sets 94a-d, respectively. That is, screen type data set 94a defines the layout and content of EMS screen 102a; screen type data set 94b defines the layout and content of nurse screen 102b; screen type data set 94c defines the layout and content of clinician screen 102c; and screen type data set 94d defines the layout and content of service technician screen 102d.

Turning first to FIG. 4, screen 102a includes a patient icon 104 and a temperature value 106. Together, patient icon 104 and temperature value 106 indicate what the current temperature of the patient is, as determined from one or more patient temperature probes 86 coupled to the patient and patient temperature probe port(s) 84. EMS screen 102a also includes water icon 108 and a water state indicator 110. Together, water icon 108 and water state indicator 110 indicate what thermal control unit 22 is doing to the water (or other fluid) that is circulating through circulation channel 36 of thermal control unit 22 (and through the one or more attached thermal pads 24). In this particular case, water icon 108 and water state indicator 110 indicate that controller 60 is controlling heat exchanger 40 such that the circulating water is being cooled.

In some embodiments, screen 102a (FIG. 4) may further include a check mark 112. Check mark 112 indicates that there are no detected issues with thermal control unit 22. In some embodiments, controller 60 is configured to display check mark 112 after checking a plurality of parameters and ensuring that each of the parameters is within an acceptable range, or in an acceptable state. For example, in one embodiment, controller 60 only displays check mark 112 after checking each fluid outlet port 58 and/or each fluid inlet port 62 to determine if an acceptable amount of fluid is flowing therethrough (e.g. there are no obstructions that are impeding an expected fluid flow), and/or to detect whether a hose 26 is coupled thereto. Controller 60 may further check to see if one or more components of heat exchanger 40 are operating within an expected range (e.g. compressor 46, condenser 48, and/or evaporator 50 are drawing an acceptable amount of current; and/or fan 52 is operating within an acceptable speed range) and/or whether one or more other components are operating within an acceptable range of operational parameters (e.g. pump 34 is drawing an acceptable amount of current). Still other parameters and/or conditions may be checked by controller 60 before displaying check mark 112. If any of the conditions or parameters checked by controller 60 are not within an acceptable range or in an acceptable condition, controller 60 does not display check mark 112, but instead may display another indicator corresponding to the undesired or unacceptable condition. The presence or absence of check mark 112 therefore provides a unified indicator for a plurality of parameters of thermal control unit 22, thereby making it easy for a user to know whether thermal control unit 22 is operating acceptably or not.

Turning next to FIG. 5, screen 102b includes patient icon 104, temperature value 106, and water icon 108. Screen 102b includes a water temperature value 114, however, instead of the water state indicator 110 of screen 102a. Water temperature value 114 provides an actual temperature reading of the water (or other fluid) that is being delivered to thermal pads 24, rather than the qualitative indication provided by water state indicator 110 of screen 102a. Water temperature value 114 is provided based on current readings from water temperature sensor 56. Controller 60 may also include on screen 102b an arrow 116 that, depending upon whether it is pointing upwards, downwards, or horizontally, indicates whether controller 60 is using heat exchanger 40 to warm the water, cool the water, or maintain the water at the current temperature (arrow 116 pointing up indicates warming the water; arrow 116 pointing down indicates cooling the water; and arrow 116 pointing horizontally indicates maintaining the water at its current temperature).

Screen 102b further includes three flow indicators 118a-c. Flow indicators 118 provide an indication of whether an acceptable flow rate is currently being maintained for each of the three fluid outlets 58. More specifically, flow rate indicator 118a indicates the flow rate through a first one of the three fluid outlets 58; flow rate indicator 118b indicates the flow rate through a second one of the three fluid outlets 58; and flow rate indicator 118c indicates the flow rate through a third one of the three fluid outlets 58. Controller 60 is configured in some embodiments to display flow indicators 118 in a first color (e.g. green) when an acceptable flow rate is detected for its corresponding fluid outlet 58 and a second color (e.g. amber or red) when a reduced flow rate is detected. In such embodiments, if no flow is detected, controller 60 may be configured to omit flow rate indicator 118 entirely. In the particular example shown in FIG. 5, flow rate indicators 118a and 118c are displayed in the first color and flow rate indicator 118b is displayed in the second color, indicating that the flow rate through the second one of the fluid outlets 58 is reduced below a threshold value. The hose 26 coupled to the fluid outlet 58 corresponding to indicator 118b therefore may be kinked, or some other fluid obstruction may be associated with this particular hose or thermal pad 24, and the display of flow indicator 118b in the second color is intended to prompt the user to investigate this corresponding hose 26 and/or thermal pad 24.

It will be understood that, although the display of flow indicators 118 on screen 102b has been described as being carried out with respect to measurements of the fluid exiting fluid outlets 58, flow indicators 118 could alternatively or additionally be displayed based on measurements of the fluid returning to thermal control unit 22 via fluid inlets 62. Thus, thermal control unit 22 may include a flow meter (not shown) for each fluid outlet 58, or a flow meter for each fluid inlet 62, or it may include a flow meter for both each fluid outlet 58 and each fluid inlet 62. In one embodiment, thermal control unit 22 includes a flow meter at each fluid inlet 62, such as the flow meters 160 disclosed in commonly assigned U.S. patent application Ser. No. 16/222,004 filed Dec. 17, 2018, by inventors Gregory S. Taylor et al. and entitled THERMAL SYSTEM WITH GRAPHICAL USER INTERFACE, the complete disclosure of which is incorporated herein by reference. Regardless of which of these sets of flow meters thermal control unit 22 includes, the outputs of the flow meters are forwarded to controller 60 and controller 60 determines what color to display indicators 118a on display 88 based on these measurements (or if to display one or more of these indicators at all).

Nurse screen 102b (FIG. 5) also includes a time icon 120 and a time value 122 displayed thereon. Time icon 120 and time value 122 together indicate how long the current thermal therapy session has lasted. In the particular example shown in FIG. 5, the current thermal therapy session has lasted for one hour, thirty-three minutes, and fourteen seconds. In some embodiments, controller 60 may alternatively display time value 122 based on how long the current phase of the current thermal therapy session has lasted, wherein the current phase may refer to one of cooling, warming, or maintaining. In such embodiments, controller 60 may include an additional indicator, or a different indicator, to clearly indicate that the indicated time refers to the elapsed time of the current phase, not the elapsed time of the entire thermal therapy session.

Nurse screen 102b also includes a graph icon 124. Controller 60 is configured to display one or more graphs on display 88 in response to a user touching, or otherwise activating, graph icon 124. In many embodiments, the particular graph displayed by controller 60 in response to the activation of graph icon 124 is a graph of the patient's temperature over time. The amount of time displayed on the graph may include the time of the entire thermal therapy session, another predefined amount of time, and/or an amount of time that is selectable by the user. Several examples of the types of graphs that may be displayed by controller 60 in response to the activation of graph icon 124 are shown in FIGS. 4-8 of the aforementioned Ser. No. 16/222,004 application whose disclosure has already been incorporated herein by reference. Still other types of graphs may be displayed in response to the activation of graph icon 124.

Turning next to FIG. 6, clinician screen 102c includes a phase label 126 and a phase identifier 128. Together, phase label 126 and phase identifier 128 indicate which phase the current thermal therapy session is in. As noted, there may be three such phases: cooling, warming, and maintaining, although it will be understood that other phases may also, or alternatively, be included. Controller 60 automatically determines what phase the current thermal therapy session is in based on the current patient temperature (and the previous patient temperature readings) and the current patient target temperature. In one embodiment, if the current patient target temperature is less than the current patient temperature and the current patient temperature has not been within a threshold proximity (such as, but not limited to, about 0.2 degrees Centigrade) of the current patient target temperature during this thermal therapy session, controller 60 concludes that the current phase is a cooling phase. If the current patient target temperature is greater than the current patient temperature and the current patient temperature has not been within the threshold proximity of the current patient target temperature since the thermal therapy session began (or since the cooling phase was completed, if there was a cooling phase), controller 60 concludes that the current phase is a warming phase. In all other cases, controller 60 is configured to conclude that the current phase is a maintenance phase. Controller 60 may also be configured to receive a patient temperature control plan that includes different phases specified therein, in which case controller 60 uses the received plan or inputs to determine what phase the thermal therapy session is currently in. The temperature control plan specifies the patient target temperature and may also indicate a length of time for the patient to be maintained at the patient target temperature, the rate at which the patient should be cooled and/or heated, and/or how long the cooling or heating phases should last.

Clinician screen 102c (FIG. 6) also includes patient icon 104 and temperature value 106 which are the same as the patient icon 104 and temperature value 106 of screen 102b. Clinician screen 102c further includes a time at target icon 130, a time at target value 132, a prescribed maintenance time icon 134, a prescribed maintenance time value 136, and a trend icon 138. Together, the time at target icon 130 and time at target value 132 indicate how long the patient's temperature has been maintained at the patient target temperature. The time at target icon 130 also includes a temperature indicator identifying what the patient target temperature currently is set to. In the example shown in FIG. 6, the target patient temperature is thirty-three degrees, and the patient has been maintained at this temperature (within a threshold proximity, such as, but not limited to, plus or minus 0.2 degree Centigrade) for three hours and eleven minutes.

The prescribed maintenance time icon 134 and prescribed maintenance time value 136 together indicate (FIG. 6) how long thermal control unit 22 has been instructed by a user to maintain the patient at the target temperature. In the particular example shown in FIG. 6, thermal control unit 22 has been instructed to maintain the patient at the target temperature (33.0° C.) for a total of ten hours and forty-five minutes. If thermal control unit 22 is currently in a phase of the thermal therapy session other than the maintenance phase, controller 60 may be configured to display other, or additional, information that is more relevant to that particular phase than the prescribed maintenance time. For example, if thermal control unit 22 is in the warming phase, controller 60 may display a prescribed rate of warming, an actual rate of warming, and/or an expected time until the patient is warmed to the prescribed temperature instead of, or in addition to, the prescribed maintenance time icon 134 and prescribed maintenance time value 136.

Clinician screen 102c also includes a graphs icon 124 that operates in the same manner as graphs icon 124 of screen 102b. In some embodiments, the graphs that are displayable by controller 60 in response to a clinician activating graphs icon 124 from screen 102c include at least one graph that is different from the set of graphs that are displayable by controller 60 in response to a nurse activating graphs icon 124 from screen 102b. The different graph, if included, may include more information than what is shown on the graph displayable via nurses' screen 102b. In other embodiments, the graphs icon 124 may display the same graph(s) in response to graph icon 124 being activated, regardless of whether icon 124 is activated from screen 102b or 102c.

Clinician screen 102c (FIG. 6) also includes trend icon 138. Controller 60 is configured to display trend information in response to a user touching, or otherwise activating, trend icon 138. Examples of the type of trend information displayed by controller 60 in response to the activation of trend icon 138 are discussed in greater detail below and shown in FIGS. 11-13. In general, the activation of trend icon 138 causes controller 60 to compute and display one or more trends in the data it is gathering from the current thermal therapy session. These trends may relate to the patient temperature readings, the water temperature readings, or other readings. Thus, for example, controller 60 may be configured to use the previously recorded patient temperature readings to extrapolate how long it will take for the patient to be warmed or cooled to a target temperature. Alternatively, or additionally, controller 60 may use past water temperature readings to extrapolate how long it will take for the water temperature to reach a desired temperature. The extrapolation of patient temperature readings to forecast a time at which the patient reaches a target temperature is discussed in greater detail below with respect to FIGS. 12 and 13. Still other types of trend information may be calculated in response to activation of trend icon 138.

Service technician screen 102d (FIG. 7) includes a fan speed value 140, a pump value 142, and a flow value 144. Fan speed value 140 indicates the current speed of fan 52. Pump value 142 indicates the current speed of pump 34 (expressed as a percentage of its maximum speed). Flow value 144 indicates the current flow rate of water being delivered to the thermal pads 24 (the total fluid flowing collectively out of the three fluid outlets 58). Other information may alternatively, or additionally, be displayed on service technician screen 102d that would be of interest to a service technician, such as, but not limited to, the time since thermal control unit 22 was last serviced; the date of the last service; the type of the last service; the time and/or date of the last cleaning of thermal control unit 22; and/or other information.

Service technician screen 102d (FIG. 7) also includes a thermal unit icon 146 and a water circuit icon 148. Touching, or otherwise activating, thermal unit icon 146 causes controller 60 display additional information about heat exchanger 40, such as, but not limited to, the speeds and/or power being drawn by any of compressor 46, condenser 48, evaporator 50, fan 52, and/or heater 44. Controller 60 may also, or alternatively, display data about the refrigerant used in chiller 42 (e.g. its current temperature, flow rate, volume, etc.), how often heat exchanger 40 has been used, statistical data regarding past usages of heat exchanger 40 (e.g. how many calories have been transferred to or from the circulating fluid by heat exchanger 40, how long heater 44 and/or chiller 42 have been activated, etc.) and/or the state of heater 44 (e.g. one or more readings from a temperature sensor contained within heater 44). Still other information may be displayed in response to the activation of thermal unit icon 146.

Touching, or otherwise activating, water circuit icon 148 of service screen 102*d* (FIG. 7) causes controller 60 to display additional information about circulation channel 36, such as, but not limited to, the state of one or more valves (e.g. valves 68, 72, etc.), current readings from sensors disposed in circulation channel 36 (e.g. flow meters, temperature sensor 56, etc.), the time since one or more filters (e.g. filter 66) were changed, the time since thermal control unit 22 was cleaned and/or disinfected, how often thermal control unit has been used, statistical data regarding the past usages (e.g. how much fluid has been cumulatively pumped, how long pump 34 has been active, etc.), and/or other information.

It will be understood by those skilled in the art that the four screen examples 102*a-d* shown herein are merely representative examples of the different types of screens that controller 60 of thermal control unit 22 may be configured to display. In other embodiments, thermal control unit 22 may be configured to display a greater number of different screens (e.g. include additional user types), display a fewer number of screens (e.g. include fewer user types), and/or utilize other user types besides the EMS, nurse, clinician, and service technician types discussed herein. Additionally, thermal control unit 22 may be modified such that the content corresponding to any of the user types is different from what is illustrated in any of FIGS. 4-7.

In some embodiments, controller 60 is configured to allow users of thermal control unit to customize the content that is displayed for a particular user type and/or to customize the different user types. That is, controller 60 is configured to allow an authorized user to specify how many different user types there are, the identity of those user types, and/or the specific sets of information that are displayed for each of the different user types.

In an alternative embodiment, thermal control unit 22 is configured to automatically select what type of screen 102 to display based on its current location. This screen selection may be an alternative to the screen selection discussed above that is performed by controller 60 with respect to a user type, or it may be in addition to the automatic screen selection based on user type. In either case, thermal control unit 22 may include one or more location sensors that detect its current location within a healthcare facility. Such sensors may take on a variety of different forms. For example, in one embodiment, thermal control unit 22 may include a WiFi transceiver that determines its location relative to the known locations of the WiFi access points within a healthcare facility based upon its detected signal strengths from the access points. In another example, thermal control unit 22 may determine its location using any of the same methods disclosed for determining patient support apparatus location in commonly assigned U.S. Pat. No. 9,838,836 issued Dec. 5, 2017, to inventors Michael J. Hayes et al. and entitled PATIENT SUPPORT APPARATUS COMMUNICATION SYSTEMS, the complete disclosure of which is incorporated herein by reference. Still other location determination methods may be used, including, but not limited to, a user manually inputting a current location of the thermal control unit 22 via user interface 76.

Regardless of the specific manner in which controller 60 is apprised of the current location of thermal control unit 22, controller 60 selects what screen to display based upon that current location. The different screens may therefore correspond to different wards, treatment centers, and/or other divisions of a particular healthcare facility. Such different locations may utilize thermal control unit 22 for different purposes (e.g. neuro trauma, cardiac arrest, surgery, pediatric care, etc.), and therefore the associated users in these various location may prefer to see different data displayed on display 88 than what the users in other locations prefer to see displayed on the display 88 of thermal control unit 22. Controller 60 therefore automatically selects different screens 102, and/or different sets of information for the different screens, based upon location. In addition to this location-based selection, controller 60 may continue to display different screens 102 based upon the particular user in the manner described above. When doing so, controller 60 may therefore end up, for example, displaying a nurse user screen 102*b* when positioned in a pediatric ward that is different from a nurse user screen 102*b* that is displayed when thermal control unit 22 is positioned in a surgical ward of the healthcare facility. Other examples are, of course, also possible.

Figure 8:
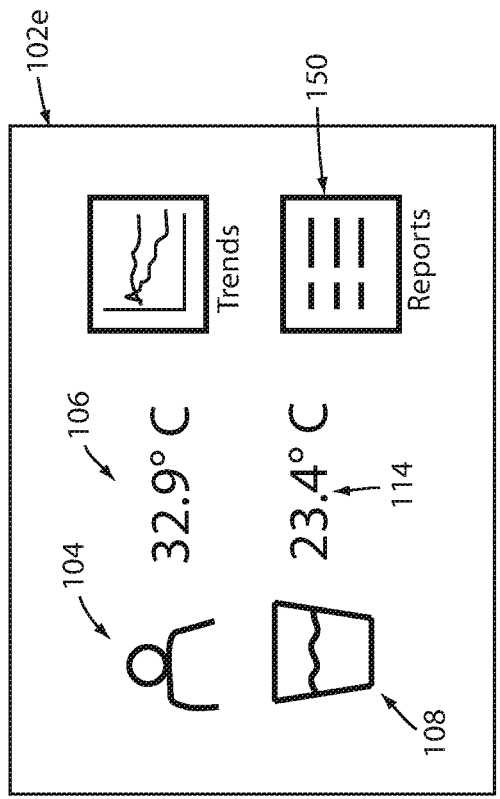
FIG. 8 is another example of a type of screen displayable on the thermal control unit that is intended for clinicians and that includes a post-session therapy report control.

FIG. 8 provides another example of a type of screen that may be displayed by controller 60 on display 88 of thermal control unit 22. In one embodiment of thermal control unit 22, controller 60 displays screen 102*e* of FIG. 8 as a clinician screen instead of clinician screen 102*c* of FIG. 6. In other embodiments, controller 60 may be configured to display screen 102*e* in place of one or more of the other screens 102*a*, *b*, or *d* of FIGS. 4, 5, and 7, respectively. As yet another alternative, controller 60 may be configured to display screen 102*e* of FIG. 8 in addition to any of the screens 102*a-d* of FIGS. 4-7. Regardless of specifically when controller 60 may be configured to display screen 102*e*, screen 102*e* includes a report icon 150 in addition to patient icon 104, temperature value 106, water icon 108, and water temperature value 114. When a user touches, or otherwise activates, report icon 150, controller 60 is configured to display one or more reports regarding one or more thermal therapy sessions. Such thermal therapy sessions include not only the current thermal therapy session (if there is one), but also previous thermal therapy sessions. The content of these reports is populated by controller 60 with data it records in memory 80 during each thermal therapy session. The data includes readings from the various sensors of thermal control unit 22, as will be discussed more below.

Figure 9:
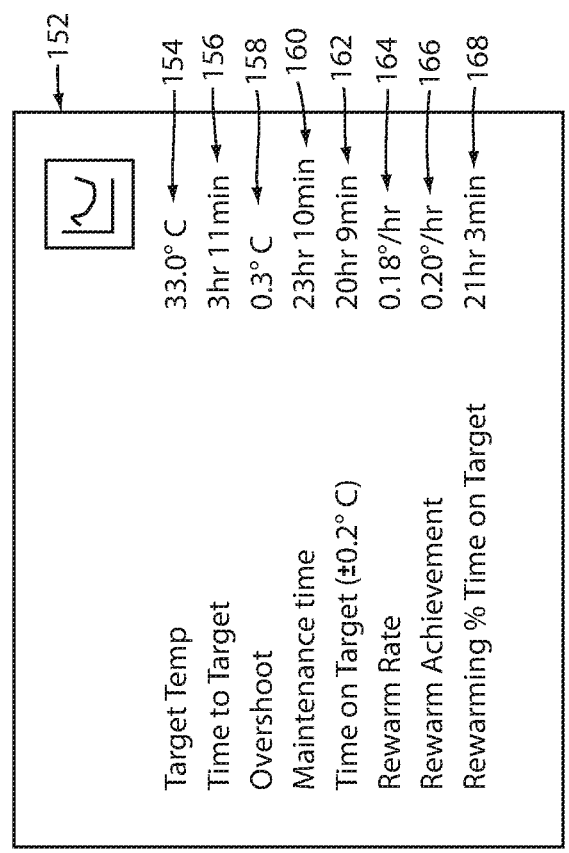
FIG. 9 is a first example of a post-session therapy report that may be generated on the screen of the thermal control unit.

FIG. 9 illustrates an example of a post-session therapy report 152 that controller 60 is configured to be able to generate and display on display 88 in response to a user activating report icon 150 (FIG. 8). Report 152 describes various parameters regarding the last thermal therapy session to be completed using thermal control unit 22. As shown in FIG. 9, report 152 includes a patient target temperature value 154, a time to target value 156, an overshoot value 158, a maintenance time value 160, a time on target value 162, a rewarm rate value 164, a rewarm achievement value 166, and a rewarming time on target value 168. It will, of course, be understood that report 152 may include fewer values, other values, additional values, and/or combinations of these.

Patient target temperature value 154 identifies the patient target temperature of the last thermal therapy session, which in the example of FIG. 9 was 33.0° C. Time to target value 156 indicates how long it took during the last thermal therapy session to bring the patient from his or her initial temperature to the patient target temperature value 154. In the example of FIG. 9, this took three hours and eleven minutes. Overshoot value 158 indicates how far the patient's temperature moved past, or overshot, the patient target temperature value 154. In the example of FIG. 9, the overshoot value was 0.3° C. This means that the patient's temperature was reduced 0.3° C. past the target temperature value 154 during the last thermal therapy session (e.g. the patient's temperature was lowered all the way to 32.7° C.).

The maintenance time value 160 identifies how long the patient's temperature was maintained at the patient target temperature value 154 during the last thermal therapy session. In the example of FIG. 9, the patient was maintained at 33° C. for a period of twenty-three hours and ten minutes. The time on target value 162 indicates how long the patient's temperature was within +/−0.2° C. of the patient target temperature value 154 during the maintenance time value 160. Thus, in the example of FIG. 9, during the twenty-three hours and ten minutes the patient was maintained at 33° C., the patient spent twenty hours and nine minutes of that time within +/−0.2° C. of 33° C. Time on target value 162 therefore provides an indication of how effectively the patient's temperature was able to be maintained at the target value during the maintenance period.

Rewarm rate value 164 (FIG. 9) indicates the rate at which thermal control unit 22 was instructed to rewarm the patient after the maintenance period ended. In this example, thermal control unit 22 was instructed to rewarm the patient at a rate of 0.18° C. per hour. Rewarm achievement rate value 166 indicates the actual rate at which the patient was rewarmed during the rewarming phase (0.20° C. per hour in the FIG. 9 example). Finally, rewarming time on target value 168 indicates how much time during the rewarming phase the patient was being rewarmed at the desired rate. In this example, the patient's rewarming rate was on target for twenty-one hours and three minutes of the rewarming phase.

It will be understood that, although report 152 has been described herein as being generated by controller 60 as a post-thermal therapy session report, controller 60 is configured, in at least some embodiments, to be able to generate report 152 during a current thermal therapy session. When generating a report during a current thermal therapy session, controller 60 omits those values that have not yet been determined, or that are not yet determinable. For example, if report 152 is generated by controller 60 before the rewarming phase has started, rewarming values 166 and 168 will not be known and may be left blank or omitted. Additionally, it will be understood that, although report 152 has also been described as pertaining to either the current thermal therapy session or the last thermal therapy session implemented using thermal control unit 22, controller 60 may be configured in some embodiments to store the data from more than the last thermal therapy session, and thereby be able to generate reports 152 from therapy sessions that occurred earlier than the last session. In other words, in some embodiments, controller 60 stores data from all of its thermal therapy sessions in memory 80 and is able to generate reports at any time for any of the previous thermal therapy sessions. In such embodiments, controller 60 may be configured to enable a user to assign a name, or other characteristic, to each thermal therapy session so that the user can more easily later retrieve the corresponding report 152 by referencing its name, or other identifier.

Figure 10:
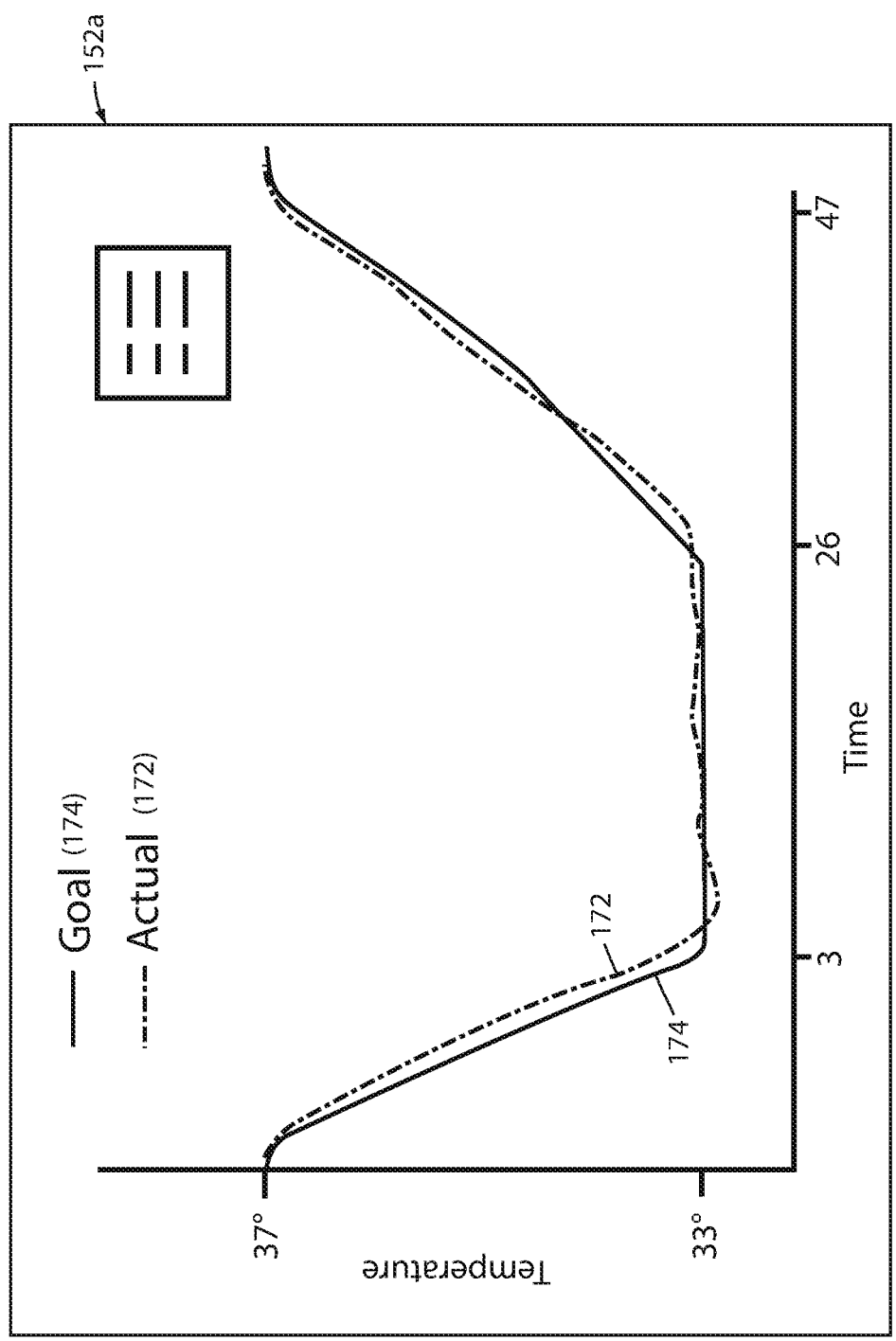
FIG. 10 is a second example of a post-session therapy report that may be generated on the screen of the thermal control unit.

FIG. 10 illustrates another example of a post-session therapy report 152*a* that controller 60 is configured to be able to generate and display on display 88 in response to a user activating report icon 150 (FIG. 8). Therapy report 152*a* contains a graph 170 of the patient's temperature readings during the thermal therapy session. More specifically, graph 170 includes an X-axis on which time is indicated (which may be measured in hours, or another unit of time) and a Y-axis on which temperature is indicated. The patient's measured temperature readings 172 are plotted on graph 170. Report 152*a* also include a plot of the target temperature values 174 during the therapy session. Report 152*a* therefore provides a graphical indication of how accurately the patient's temperature followed the patient target temperatures during the therapy session.

It will be understood that report 152*a* may be supplemented with additional information. For example, in some embodiments, controller 60 is configured to generate report 152 with any of the additional event information disclosed in the aforementioned commonly assigned U.S. patent application Ser. No. 16/222,004, which was previously incorporated herein by reference. Such event information includes, but is not limited to, information regarding the delivery of medication (including type of medication, amount, and/or time of delivery); the onset and/or termination of shivering; the adjustment, relocation, cleaning, and/or replacement of one or more thermal pads 24 on the patient; the adjustment, relocation, cleaning, and/or replacement of a temperature sensor 86; the changing of a setting on thermal control unit 22 (e.g. a rate of heating or cooling, a range of acceptable fluid temperature, etc.); the performance of a maintenance task associated with the thermal control unit; the detection of an error and/or a patient alert event (e.g. a low potassium level, an elevated blood pressure, a low blood pressure, a low oxygen level, etc.); and/or the flushing a patient's body adjacent a temperature sensor.

Some or all of this event data may be manually entered by the user via user interface 76. Controller 60 may also, or alternatively, be configured to automatically detect one or more of these events and add them to the report 152*a*, such as, but not limited to, the automatic detection of patient shivering, the changing of a setting on thermal control unit 22 (e.g. a target temperature, an acceptable range, a warming or cooling rate, etc.), and/or the performance of a maintenance task. Several manners in which controller 60 and thermal control unit 22 can be configured to automatically detect patient shivering are disclosed in commonly assigned U.S. patent application Ser. No. 15/820,558 filed Nov. 22, 2017, by inventors Gregory S. Taylor et al. and entitled THERMAL SYSTEM, the complete disclosure of which is incorporated herein by reference. Other manners of detecting shivering can, of course, be used.

It will also be understood that controller 60 is configured to be able to transfer reports 152, 152*a* to one or more external devices, such as, but not limited to, a USB thumb drive, a local area network (such as a server thereon), a laptop, etc. Still further, in some embodiments, controller 60 is configured to be able to receive thermal data from other devices (such as other patient temperature control devices) that were used to treat the same patient, and to add that data to the data generated during the usage of thermal control unit 22 to control the patient's temperature. In such cases, reports 152 and/or 152*a* may include some data that was generated from a temperature control device previously used with that particular patient. Further details regarding one manner in which controller 60 can be configured to perform these and other data transfers can be found in commonly assigned U.S. patent application Ser. No. 15/616,574 filed Jun. 7, 2017, by inventors Gregory S. Taylor et al. and entitled THERMAL CONTROL SYSTEM, the complete disclosure of which is incorporated herein by reference. Other methods and/or structures for sharing thermal report data may also or alternatively be used.

It will be understood by those skilled in the art that controller 60 may be modified to generate other types of reports besides the two report examples 152 and 152*a* shown and described herein. Such additional or alternative reports may include one or more reports specifically tailored to service technicians, and/or additional or alternative reports that include additional patient data (such as patient data read from an EMR server in which controller 60 is in communication), and/or still other types of reports. In some embodiments, controller 60 is configured to allow users of thermal control unit 22 to customize the content and/or layout of the report(s) 152, 152*a*, etc. it generates.

Figure 11:
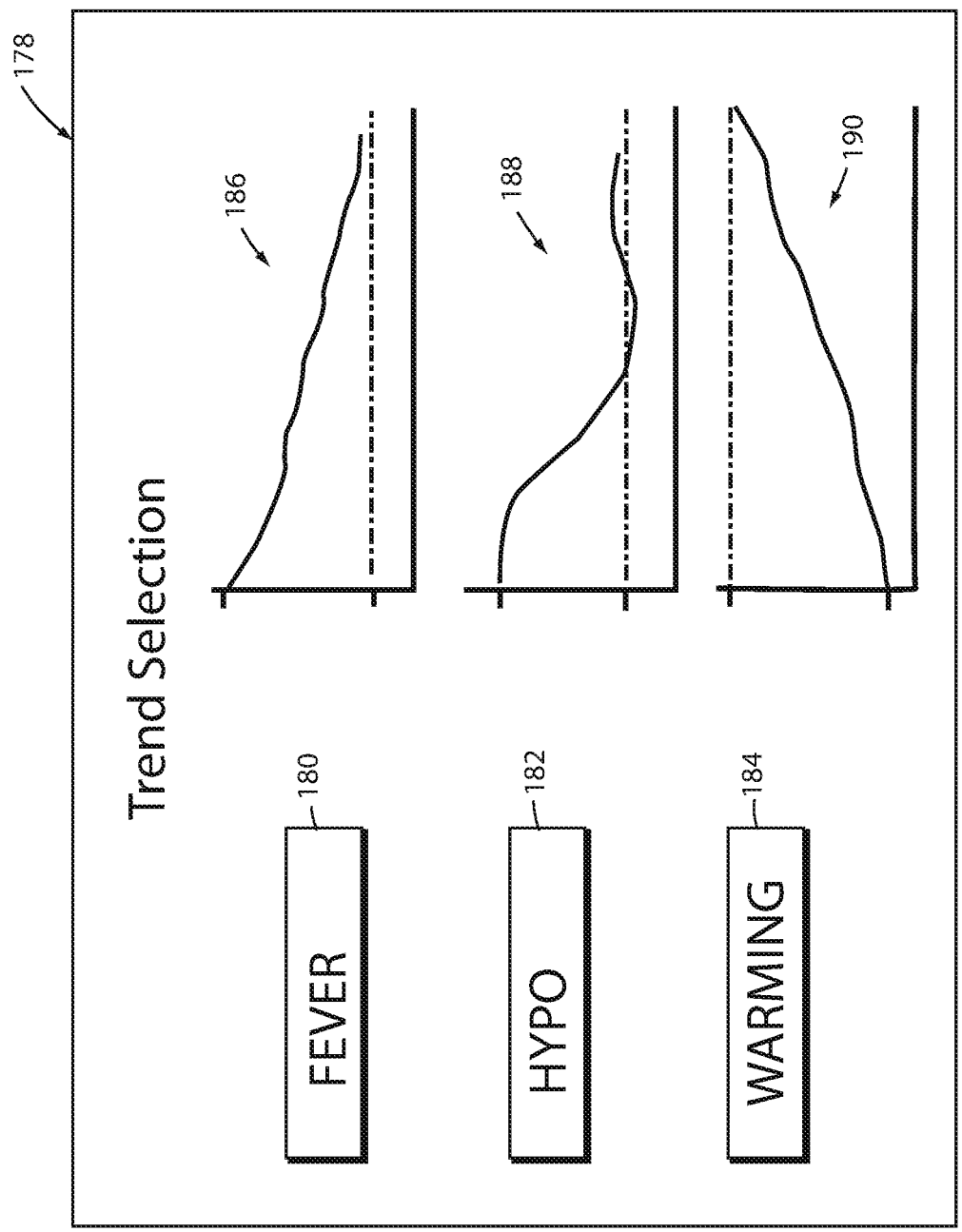
FIG. 11 is an example of a trend selection screen adapted to allow a user to categorize a current or upcoming thermal therapy session.

FIG. 11 illustrates one example of a trend selection screen 178. Trend selection screen 178 is displayed by controller 60 in response to the user touching, or otherwise activating, a trend control, such as the trend icon 138 on screen 102*c* of FIG. 6. Trend icon 138 and trend selection screen 178 are provided in order to allow a user to see how one or more parameters or a current thermal therapy session are trending, as well as, in some embodiments, how those trends compare to past statistical data gathered from previous usages of thermal control unit 22. Thus, for example, trend icon 138 and trend selection screen 178 can be used if a user is interested in seeing not only the patient's measured temperature readings graphed over time, but also how those readings are trending and what the user may expect in the future regarding those readings.

Trend selection screen 178 is provided, in some embodiments, in order to allow controller 60 to categorize the current purpose for which thermal control unit 22 is being used, which may better allow controller 60 to determine one or more data trends. In some embodiments, trend selection screen 178 may be omitted. Trend selection screen 178, when provided, prompts the user select a usage category corresponding to the purpose for which thermal control unit 22 is currently being used. In the example of FIG. 11, trend selection screen 178 identifies three different use categories for which thermal control unit 22 may be used: to treat a patient's fever, to induce hypothermia in the patient, or to warm the patient. Trend selection screen 178 includes a fever selection icon 180, a hypothermia selection icon 182, and a warming selection icon 184. Trend selection screen 178 also includes a fever temperature graph 186, a hypothermia temperature graph 188, and a warming temperature graph 190.

If thermal control unit 22 is being used to control a patient's fever, the user selects fever selection icon 180, such as by touching it, or otherwise activating it. Fever temperature graph 186 is provided adjacent to fever selection icon 180 in order to illustrate a typical graph of a patient's temperature for a patient who is having his or her fever treated via thermal control unit 22. Fever temperature graph 186 therefore provides a general illustration of the type of temperature graph one might expect if the user were to use thermal control unit 22 for controlling a patient's fever.

If thermal control unit 22 is being used to induce hypothermia in a patient, the user selects hypothermia selection icon 182, such as by touching it, or otherwise activating it. Hypothermia graph 188 is provided adjacent to hypothermia selection icon 182 in order to illustrate a typical graph of a patient's temperature for a patient who undergoing induced hypothermia.

If thermal control unit 22 is being used to warm a patient, the user selects warming selection icon 184. Warming temperature graph 190 is provided adjacent to warming selection icon 184 in order to illustrate a typical graph of a patient's temperature for a patient who is being warmed.

It will be understood that trend selection screen 178 may be modified to include additional or fewer trend selection controls than the ones illustrated in FIG. 11. Such additional trend selection controls include, but are not limited to, a trend selection control intended to be activated when thermal control unit 22 is being used to treat a pediatric patient; one or more further refinement selection controls that further refine the purpose of the hypothermia inducement of thermal control unit 22, such as a control for surgery, a control for post-cardiac arrest treatment, and/or a control for neuro-trauma. Regardless of the specific number of controls that may be included on trend selection screen 178, controller 60 is configured to store the selection made by the user on screen 178 and to associate that selection with the data subsequently gathered during the subsequent thermal therapy session. In other words, controller 60 uses the trend selection made via screen 178 to categorize the data gathered during the subsequent thermal therapy session. This categorization is used when computing trends in the data and/or when comparing the current data to past data that was previously gathered for the same category of treatment, as will be discussed in greater detail below.

Figure 12:
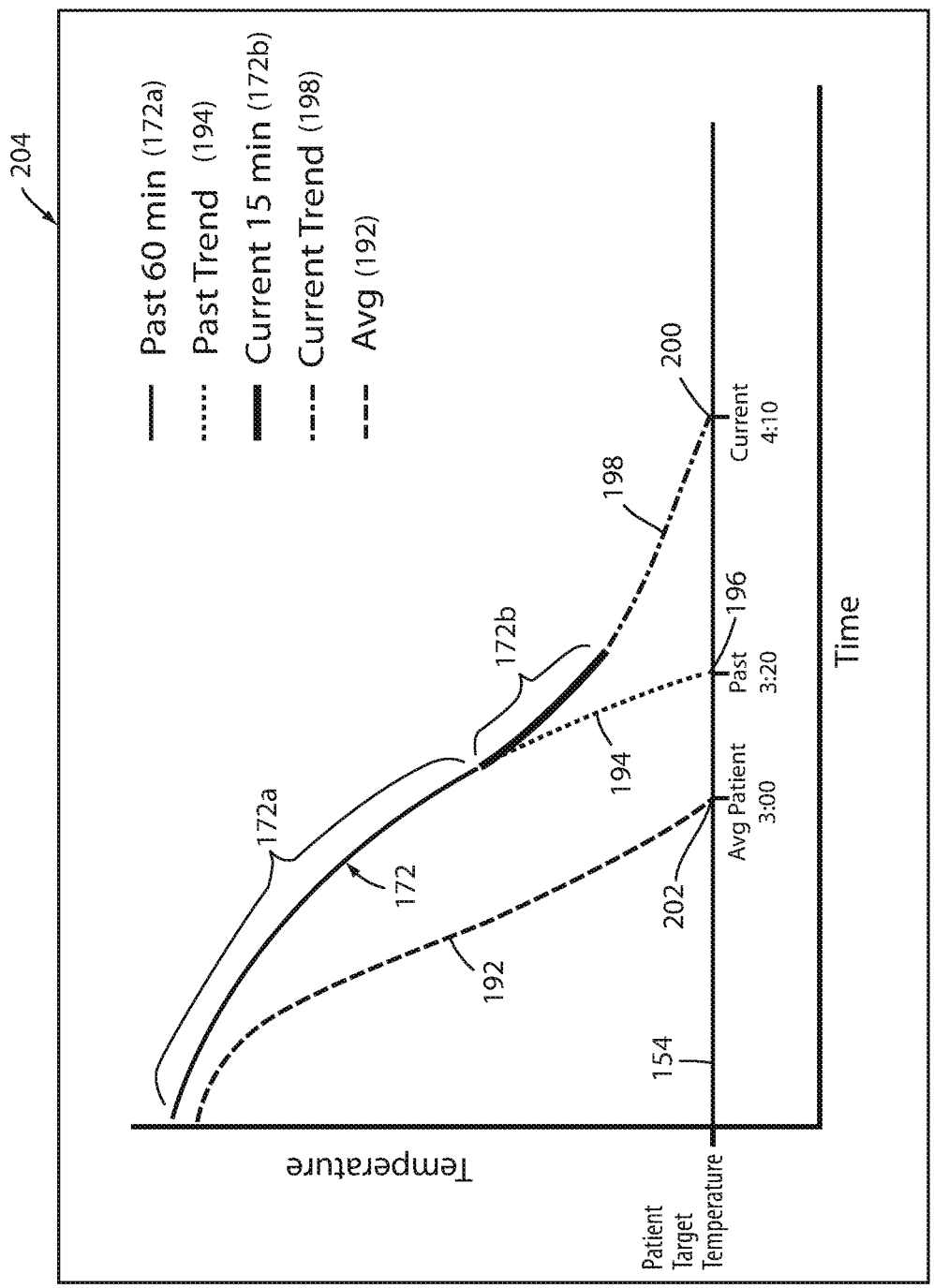
FIG. 12 is a first example of a trend screen showing a graph of current patient temperature readings, trends of the patient temperature readings, and past statistical data.

FIG. 12 illustrates an example of a trend screen 204 that is displayable by controller 60 on display 88 of thermal control unit 22. Trend screen 204 includes a graph 172 of the patient's measured temperature readings, as well as a graph 192 of average patient temperature readings. The patient's measured temperature readings graph 172 is divided into two sections: a first section 172*a* and a second section 172*b*. First section 172*a* graphs the patient temperature readings that were taken over a one hour period extending from approximately seventy-five minutes previous to approximately fifteen minutes previous to the current time. Second section 172*b* graphs the patient temperature readings that were taken in approximately the last fifteen minutes.

The reason for dividing the patient temperature readings graphs 172 into multiple sections is because controller 60 is configured to compute a separate trend graph for each of these different sections. Thus, controller 60 is configured to compute a first trend graph 194 that extends the trend of first section 172*a* until it reaches the patient target temperature value 154. Controller 60 is also configured to compute a second trend graph 198 that extends the trend of second section 172*b* until it reaches the patient target temperature value 154. Controller 60 is further configured to compute the intersection 196 of first trend graph 194 with the patient target temperature value 154, which is identified in screen 204 with its corresponding time value (i.e. three hours and twenty minutes in the example of FIG. 12), as well as the intersection 200 of second trend graph 198 with the patient target temperature value 154, which is also identified with its corresponding time value (i.e. four hours and ten minutes in the example of FIG. 12). Trend graphs 194 and 198 provide an easy-to-understand visual indication of how the trajectory, or trend, of the patient's temperature readings have recently shifted (e.g. within the last fifteen minutes). This helps alert the caregiver to any upcoming changes in the patient's temperature that may be different from what was expected based on the old temperature readings (e.g. section 172*a*). Further, the computation of trends 194 and/or 198 helps the caregiver see when to expect the arrival of the patient's temperature at the patient target temperature 154, Trends 194 and/or 198 also alert the caregiver of any potentially significant changes in the patient's expected temperature that may warrant intervention at the current time (e.g. a trend showing a much longer arrival time at the target temperature might be indicative of shivering, or upcoming shivering).

In one embodiment of thermal control unit 22, controller 60 is configured to compute trend graphs 194 and/or 198 using conventional mathematical extrapolation techniques based on the previously recorded patient temperature readings (e.g. sections 172a or 172b). In some embodiments, linear extrapolation may be used, although polynomial extrapolation may better account for changes in the curvature of sections 172a and/or 172b). If using polynomial extrapolation, such extrapolation may be performed using Lagrange interpolation, Newton's method of finite differences, and/or by other methods. As yet another alternative, French curve extrapolation may be used by controller 60 to generate trend graphs 194 and/or 198. Still other extrapolation techniques may be used.

It will be understood by those skilled in the art that thermal control unit 22 and controller 60 may be modified to generate different trend graphs than the two trend graphs 194 and 198 shown in FIG. 12. Such modifications include the generation of additional graphs, the generation of fewer graphs, and/or the generation of different graphs. With respect to the generation of additional graphs, controller 60 may be modified to generate trend graphs for different time periods beyond the sixty minute and fifteen-minute time periods shown in FIG. 12. With respect to the generation of fewer graphs, controller 60 may be modified to generate only a single one of graphs 194 or 198. With respect to the generation of different graphs, controller 60 may be modified to generate two graphs using at least one time period that is different from the sixty and fifteen minute time periods of graphs 194 and 198, respectively. Still further, in some embodiments, controller 60 is configured to allow a user to customize the time periods it uses for generating one or more trend graphs, thereby enabling the user, for example, to select a trend graph based on the last half hours' worth of patient temperature readings, or the last two hours' worth of patient temperature readings, or some other range of time. Still other modifications may be made to the calculation of one or more trend graphs.

FIG. 12 also includes average patient temperature readings graph 192. Controller 60 is configured to display the average patient temperature readings graph 192 based on data retained in memory 80 from previous uses of thermal control unit 22. More specifically, controller 60 is configured to generate average reading graphs 192 based on the set of historical statistical data 92 stored in memory 80 (see FIG. 3). In some embodiments, external data from past thermal treatment sessions, such as those from other thermal control units, may be transferred to memory 80 from an external device and added to the historical statistical data 92, thereby enlarging the set of data controller 60 uses to compute average patient temperature readings graph 192.

In at least one embodiment, controller 60 is configured to generate average patient temperature readings graph 192 based on only that portion of the historical statistical data 92 that is in the same category of thermal treatment as the current thermal therapy session. Thus, if the current user of thermal treatment has elected to use thermal control unit 22 for treating a patient's fever (and thus selected fever selection icon 180 of FIG. 11), controller 60 computes the average temperature readings of only the past statistical data 92 that corresponds to previous uses of thermal control unit 22 for controlling a patient's fever. In other words, in this example, the average temperature readings graph 192 would not be based on temperature readings gathered from past thermal therapy sessions where thermal control unit 22 was used to induce hypothermia, or where thermal control unit 22 was used to warm a patient.

Similarly, if the current user of thermal control unit 22 is using thermal control unit 22 to induce hypothermia in a patient, controller 60 is configured to compute average patient readings graphs 192 based only on the portion of the previous historical statistical data 92 that corresponds to hypothermia induction treatments, and controller 60 does not use data from previous uses of thermal control unit 22 to treat a fever or to warm a patient when determining average graph 192. Likewise, if the current user of thermal control unit 22 is using thermal control unit 22 to warm a patient, controller 60 is configured to compute average patient temperature graph 192 based only the portion of the previous historical statistical data 92 that corresponds to warming treatments, and controller 60 does not use data from previous uses of thermal control unit 22 that were undertaken to treat fevers or to induce hypothermia. In short, controller 60 computes average patient temperature readings graph 192 based only on past data that falls within the same treatment category. If controller 60 is configured to subdivide one or more of these categories into one or more subcategories (e.g. hypothermia induction for surgery versus hypothermia induction for cardiac arrest), controller 60 can be configured to compute average patient temperature readings graph 192 from only that portion of the previous data that falls within both the same category and subcategory.

Average patient temperature readings graph 192 is shown in FIG. 12 to intersect the patient target temperature 154 at an intersection point 202. By identifying intersection point 202 on the X-axis of the graph of screen 204, the user of thermal control unit 22 is provided with an easily understood indication of how the current thermal therapy treatment is comparing to the previous thermal therapy treatments that fall in the same treatment category (e.g. fever reduction, hypothermia induction, warming). Further, from trend lines 194 and/or 198 and their intersections 196 and 200, respectively, with patient target temperature line 154, the user is able to see how much the current thermal therapy treatment is likely to differ from the average thermal treatment in terms of the amount of time it takes to bring the patient to the target temperature.

As was noted previously, controller 60 calculates average patient temperature readings graph 192 using the past statistical data 92 maintained in memory 80. Controller 60 is further configured to add to this data every time thermal control unit 22 is utilized to treat a patient. That is, controller 60 stores in memory 80 the patient temperature readings graphs 172 from the current thermal therapy session and, once the session is over, adds it to the past statistical data 92. After adding it to the past statistical data 92, controller 60 is configured to combine the newly added data with the old data and compute a new average graph 192. Thus, each time thermal control unit 22 is used for a thermal therapy session, the data from that thermal therapy session is eventually added to the past statistical data set 92 and used for computing the average graph 192. Further, as will be discussed in more detail below, the latest data added to data set 92 may also be used to update other statistical data in addition to, or in lieu of, the average data, such as, but not limited to, the calculation of a dispersion value.

In addition to determining average graph 192 based on only data from the same treatment category as the current thermal therapy session, controller 60 is further configured to be able to make other selections regarding what data is to be used from past statistical data set 92 when computing average graph 192. Thus, for example, controller 60 may be configured to either automatically select, or allow a user to select, only the data within past statistical data set 92 that not only falls within the same treatment category as the current treatment, but that includes the same patient target temperature. Consequently, as a more specific example, if thermal control unit 22 is currently being used to treat a patient by inducing hypothermia and the target temperature for the patient is 32° C., controller 60 is configurable to compute average graph 192 using only the data from data set 92 that corresponds to hypothermia treatment sessions where the previous patients' temperatures were reduced to 32° C. In this manner, the average temperature graph 192 more closely aligns with the same type of treatment that is currently being implemented with thermal control unit 22.

In addition to changing and/or controlling what data from past statistical data set 92 controller 60 uses for computing average graph 192, thermal control unit 22 may be configured such that controller 60 is capable of displaying a variety of additional information on screen 204. Such additional information includes, but is not limited to, one or more additional graphs and/or other information regarding the treatment of a patient, such as the addition of the target temperature graph 174 of FIG. 10, and/or any of the event data identified above and referenced in the commonly assigned U.S. patent application Ser. No. 16/222,004, which was previously incorporated herein by reference.

Figure 13:
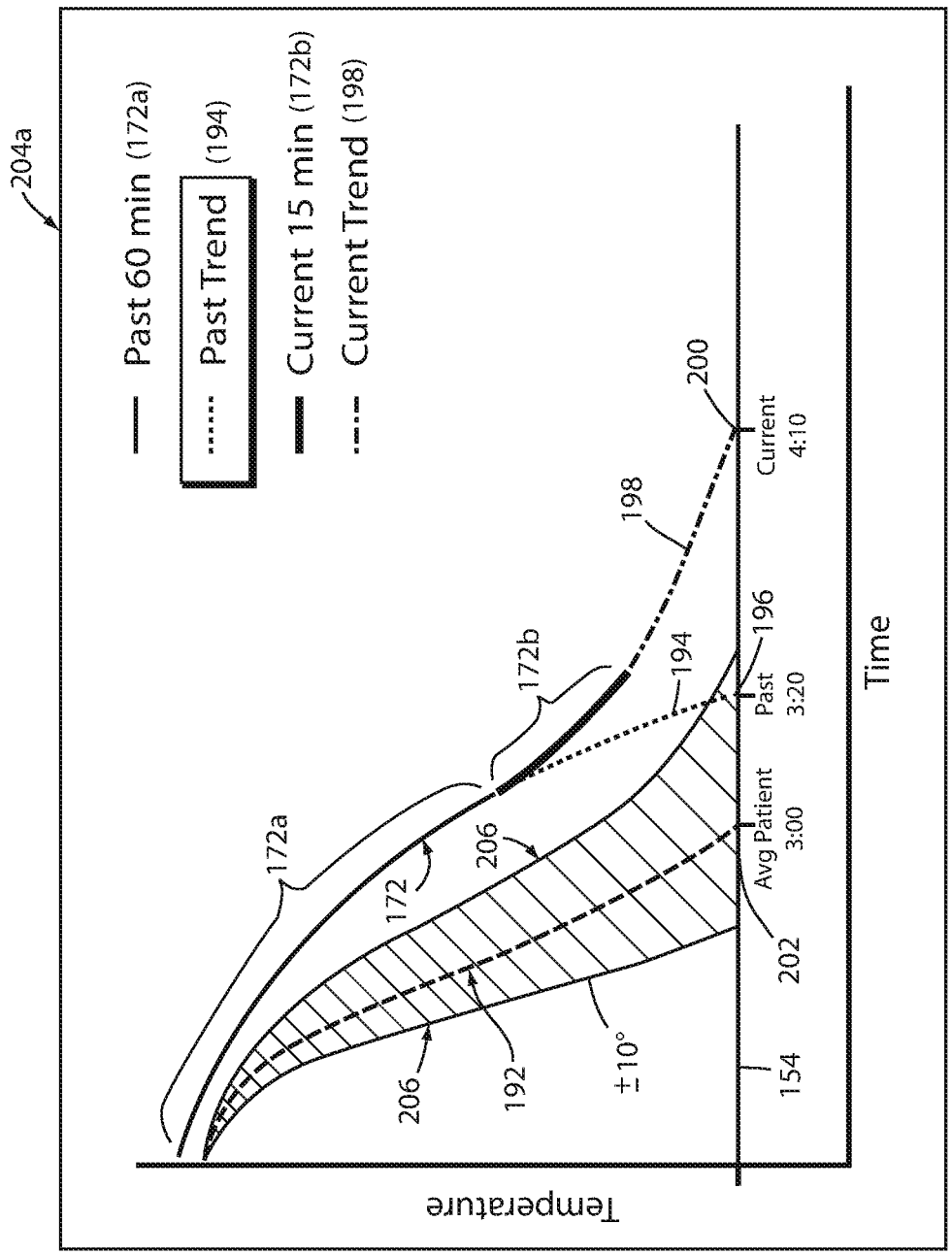
FIG. 13 is a second example of a trend screen showing a graph of current patient temperature readings, trends of the patient temperature readings, and past statistical data.

FIG. 13 illustrates another example of a trend screen 204*a* that is displayable by controller 60 on display 88 of thermal control unit 22. Trend screen 204*a* includes a number of items that are the same as what is found on trend screen 204, such as a patient temperature readings graph 172 (including sections 172*a* and 172*b*), average temperature readings graph 192, first trend graph 194, second trend graph 198, and intersections 196, 200, and 202. These common items are the same as what was discussed above with respect to FIG. 12. Screen 204*a* of FIG. 13 differs from screen 204 of FIG. 12 in that it includes a dispersion graph 206. Dispersion graph 206 illustrates the dispersion of the patient temperature values that were averaged together to generate average value graph 192. Dispersion graph 206 therefore provides additional information to the user regarding how much dispersion is common from the average values indicated by average value graph 192.

In the particular example shown in FIG. 13, the boundaries of dispersion graph 206 are defined at the first standard deviation level. Controller 60 is configured to allow the user to change this dispersion value. For example, if the user wishes to see the two standard deviation level of the patient temperature readings, he or she can instruct controller 60 to display these values via user interface 76. Similarly, if the user wishes to see still other dispersion values, he or she can instruct controller 60 to display those values on the graph of screen 204*a* via appropriate manipulation of user interface 76. Still further, controller 60 is configured to allow a user to display multiple dispersion levels on the same graph (e.g. in different colors) so that the caregiver is better apprised of just how typical, or atypical, the patient temperature readings from the current thermal therapy session are with respect to the past statistical data set 92. The display of these dispersion values also allows the caregiver to easily and visually see how typical or atypical the trend graphs 194 and/or 198 are with respect to the temperature readings from the past statistical data set 92.

As with the average values discussed above with respect to FIG. 12, the dispersion values of FIG. 13 are based on only those portions of the past statistical data set 92 that correspond to the same category of treatment (e.g. fever, hypothermia, warming, etc.). Still further, after a thermal therapy session is done, controller 60 adds the patient temperature readings from the completed thermal therapy session to past statistical data set 92 and re-calculates the dispersion values for the corresponding category using the newly added data. The dispersion values are therefore updated with each use of thermal control unit 22 and the past statistical data set is augmented with each usage of thermal control unit 22. In some embodiments, depending upon the size of memory 80, controller 60 may automatically discard the oldest data contained within historical data set 92 if memory 80 reaches its capacity. Alternatively, controller 60 may be configured to transmit its data to a remote device, such as a server, wherein the server maintains the past statistical data set 92 in a memory sufficient to accommodate all of the usages of thermal control unit 22.

In some embodiments, thermal control unit 22 is configurable by a user to issue an alert whenever the patient's temperature readings, and/or a trend in the patient's temperature readings, differs by more than a user-selected amount from the past historical data 92 of the same treatment category. Thus, for example, the user can instruct thermal control unit 22 via user interface 76 to issue an alert if the patient's rate of cooling varies from the past historical data by more than two standard deviations (or some other user-selected amount). Additionally, the alert may be configurable by the user to also include a time value, wherein the alert is only issued if the patient's temperature readings differ from the past statistical data by more than the user-selected amount for more than a user-defined amount of time. These configuration settings allow the user to be notified that he or she is working with a patient whose temperature responsiveness is atypical, which may prompt the user to take extra precautions and/or other steps.

It will be understood by those skilled in the art that thermal control unit 22 may be modified in a number of ways from the manner in which it has been described above. For example, although thermal control unit 22 has been described above as incorporating the following three general functions of (1) presenting different screen types for different users, (2) generating thermal therapy session reports, and (3) generating trends and/or comparisons to past statistical data, it will be understood by those skilled in the art that thermal control unit 22 may be modified to omit one or more of these functions. Thus, for example, in some embodiments, thermal control unit 22 presents different screen types to different users, but does not generate any thermal therapy reports and/or doesn't generate trends and/or comparisons to past statistical data. As another example, in some embodiments, thermal control unit 22 presents the same screens to all of the users but generates at least one of the thermal reports or trends (and/or past statistical data comparisons). Still other combinations of the functions described herein may be implemented in thermal control unit 22.

It will also be understood by those skilled in the art that thermal control unit 22 may be additionally and/or alternatively modified to incorporate any of the temperature overshoot reduction methods, structures, and/or algorithms disclosed in commonly assigned U.S. patent application Ser. No. 62/610,319 filed Dec. 26, 2017, by inventors Gregory Taylor et al. and entitled THERMAL SYSTEM WITH OVERSHOOT REDUCTION, the complete disclosure of which is incorporated herein by reference. Additionally or alternatively, thermal control unit 22 may use any of the data and algorithms disclosed in U.S. patent application Ser. No. 62/610,334 filed Dec. 26, 2017, by inventors Christopher Hopper et al. and entitled THERMAL CONTROL SYSTEM when determining when a patient's core temperature will reach its target temperature, and/or when to transition from heating the circulating fluid to cooling the circulating fluid, and vice versa, in order to reduce overshoot. This '334 application is hereby incorporated herein by reference in its entirety.

Still further, it will be understood that thermal control unit 22 may be modified to additionally operate in conjunction with one or more auxiliary sensors used to sense one or more non-temperature patient parameters. When so modified, thermal control unit 22 may utilize the auxiliary sensors in any of the manners, and using any of the structures and/or algorithms, disclosed in commonly assigned U.S. patent application Ser. No. 62/610,327 filed Dec. 26, 2017, by inventors Gregory S. Taylor et al. and entitled THERMAL SYSTEM WITH PATIENT SENSOR(S), the complete disclosure of which is incorporated herein by reference.

Additionally, it will be understood that thermal control unit 22 may be implemented to include any of the physical and/or functional aspects of the commercially available Altrix™ Precision Temperature Management System manufactured and sold by Stryker Corporation of Kalamazoo, Michigan, many details of which are described in the Operations Manual for the Altrix™ Precision Temperature Management System (doc. 8001-009-001 Rev. G), published in 2016, the complete disclosure of which is also incorporated herein by reference.

Various other alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A thermal control unit for controlling a patient's temperature during a thermal therapy session, the thermal control unit comprising:
    a main body;
    a fluid outlet adapted to fluidly couple to a fluid supply line;
    a fluid inlet adapted to fluidly couple to a fluid return line;
    a circulation channel coupled to the fluid inlet and the fluid outlet;
    a pump for circulating fluid through the circulation channel from the fluid inlet to the fluid outlet;
    a heat exchanger adapted to add or remove heat from the fluid circulating in the circulation channel;
    a fluid temperature sensor adapted to sense a temperature of the fluid;
    a patient temperature sensor port adapted to receive patient temperature readings from a patient temperature sensor;
    a user input adapted to receive an input indicative of a type of user of the thermal control unit;
    a display mounted to the main body; and
    a controller positioned within the main body and adapted to control the heat exchanger in order to control the patient's temperature through a plurality of phases, the controller further adapted to automatically select a particular screen from amongst a plurality of types of screens to display on the display during the thermal therapy session, the controller adapted to select the particular screen based on the input indicative of the type of user of the thermal control unit, wherein the plurality of types of screens include a first screen and a second screen, the first screen including a current temperature of the patient and data indicative of a current one of the plurality of phases, and the second screen including the current temperature of the patient but excluding the data indicative of the current one of the plurality of phases.

2. The thermal control unit of claim 1 wherein the type of user of the thermal control unit includes at least the following types: a nurse, a clinician, and a service technician.

3. The thermal control unit of claim 1 wherein the user input is a wireless sensor adapted to detect a signal from a badge worn by the user and the wireless sensor is a Radio-Frequency (RF) identification sensor.

4. The thermal control unit of claim 1 further including a memory in which past rates of change of patient temperatures from previous thermal therapy sessions are stored, and wherein the controller is configured to display on the display a comparison of a current rate of change of patient temperature to the past rates of change of patient temperature.

5. The thermal control unit of claim 1 further including a memory in which past statistical data from multiple previous thermal therapy sessions is stored, and wherein the controller is configured to display on the display a comparison of a current parameter of a current thermal therapy session to an average value of the current parameter calculated using the past statistical data from the multiple previous thermal therapy sessions.

6. The thermal control unit of claim 1 wherein the controller is further adapted to select the particular screen based on a current location of the thermal control unit within a healthcare facility.

7. A thermal control unit for controlling a patient's temperature during a thermal therapy session, the thermal control unit comprising:
    a fluid outlet adapted to fluidly couple to a fluid supply line;
    a fluid inlet adapted to fluidly couple to a fluid return line;
    a circulation channel coupled to the fluid inlet and the fluid outlet;
    a pump for circulating fluid through the circulation channel from the fluid inlet to the fluid outlet;
    a heat exchanger adapted to add or remove heat from the fluid circulating in the circulation channel;
    a fluid temperature sensor adapted to sense a temperature of the fluid;
    a patient temperature sensor port adapted to receive patient temperature readings from a patient temperature sensor;
    a display;
    a memory; and
    a controller adapted to perform the following: to control the heat exchanger in order to control the patient's temperature, to display on the display a graph comparing a current parameter of the current thermal therapy session to past statistical data from previous thermal therapy sessions implemented using the thermal control unit, to record in the memory patient temperature readings with respect to time during a current thermal therapy session, to record in the memory a first number equal to a total amount of time the patient temperature is within a threshold range of a patient target temperature during a maintenance phase of the current thermal therapy session, to display on the display the recorded patient temperature readings with respect to time after the current thermal therapy session is completed, to display on the display the first number after the current thermal therapy session is completed, to determine a second number equal to an amount of overshoot of the recorded patient temperature readings with respect to the patient target temperature, and to display the second number after the current thermal therapy session is completed.

8. The thermal control unit of claim 7 wherein the controller is further adapted to record in the memory an amount of time between commencement of the thermal therapy session and arrival of the patient at the patient target temperature, and wherein the controller is further adapted to display the amount of time on the display after the current thermal therapy session is completed.

9. The thermal control unit of claim 8 wherein the controller is further adapted to perform the following:
   (i) to record in the memory a target rate at which the patient is to be rewarmed during the current thermal therapy session;
   (ii) to display the target rate on the display after the current thermal therapy session is completed;
   (iii) to record in the memory an actual rate at which the patient is rewarmed during the current thermal therapy session;
   (iv) to display the actual rate on the display after the current thermal therapy session is completed;
   (v) to record in the memory a percentage of time the actual rate is within a range of the target rate while the patient is rewarmed during the current thermal therapy session; and
   (vi) to display the percentage of time on the display after the current thermal therapy session is completed.

10. The thermal control unit of claim 7 further comprising a user input adapted to receive an input indicative of a type of user of the thermal control unit, and wherein the controller is further configured to perform the following:
   (i) to automatically select a particular screen from amongst a plurality of types of screens to display on the display during the current thermal therapy session, the controller adapted to automatically select the particular screen based on the input indicative of the type of user of the thermal control unit;
   (ii) to allow a user to select from at least three different types of users, wherein the plurality of types of screens include at least a first screen, a second screen, and a third screen, and the first screen includes a first set of information, the second screen includes a second set of information, the third screen includes a third set of information, and the first set of information is a subset of the second set of information; and
   (iii) to allow a user to customize what information is contained within at least one of the first, second, or third sets of information.

11. The thermal control unit of claim 7 wherein the controller is further adapted to perform the following:
   (i) to record in the memory past rates of change of patient temperatures from previous thermal therapy sessions;
   (ii) to display on the display a comparison of a current rate of change of patient temperature to the past rates of change of patient temperature;
   (iii) to record in the memory past statistical data from previous thermal therapy sessions; and
   (iv) to display on the display a comparison of a current parameter of the current thermal therapy session to the past statistical data.

12. The thermal control unit of claim 7 wherein the current parameter includes current patient temperature readings displayed with respect to time, and wherein the past statistical data includes a dispersion value of past patient temperature readings displayed with respect to time.

* * * * *